United States Patent
Smith et al.

(10) Patent No.: US 10,777,060 B2
(45) Date of Patent: *Sep. 15, 2020

(54) ELECTRONIC DEVICE AND COMPUTER APPLICATION MONITORING, ALERT, AND INTERVENTION SYSTEM AND METHOD

(71) Applicant: K&M Bristol Holdings, LLC, Dartmouth, MA (US)

(72) Inventors: Kenneth Smith, East Greenwich, RI (US); Matthew Philips, Dartmouth, MA (US)

(73) Assignee: K&M BRISTOL HOLDINGS, LLC, Dartmouth, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,618

(22) Filed: Sep. 9, 2019

(65) Prior Publication Data
US 2020/0074829 A1 Mar. 5, 2020

Related U.S. Application Data

(63) Continuation of application No. 15/839,726, filed on Dec. 12, 2017, now Pat. No. 10,410,494.

(Continued)

(51) Int. Cl.
*H04L 29/06* (2006.01)
*G08B 21/02* (2006.01)
(Continued)

(52) U.S. Cl.
CPC .......... *G08B 21/0205* (2013.01); *G06F 11/30* (2013.01); *G06F 11/3013* (2013.01);
(Continued)

(58) Field of Classification Search
CPC ............ G08B 21/0205; G08B 21/0269; G08B 21/0272; H04W 4/38; H04W 4/00;
(Continued)

(56) References Cited

U.S. PATENT DOCUMENTS 8,472,923 B2  6/2013  Fellingham et al.
8,484,327 B2  7/2013  Werner et al.
(Continued)

FOREIGN PATENT DOCUMENTS

WO  2016210327  12/2016

OTHER PUBLICATIONS

International Search Report and Written Opinion dated Feb. 27, 2018, issued in corresponding International Application No. PCT/US17/65902.

*Primary Examiner* — Munear T Akki
(74) *Attorney, Agent, or Firm* — Onello & Mello, LLP

(57) ABSTRACT

In accordance with aspects of the inventive concept, provided is a monitoring and alert system that enables one or more monitoring individuals, e.g., parents, to monitor social media usage, Internet usage, application usage, content, communications, location, and/or other aspects of one or more other monitored users, e.g., their children. The monitoring and alert system can utilize social media, electronic communications, cellular data, positioning data, and navigation data, as examples, relating to and/or generated from a monitored user's activity on its mobile device to acquire data used to generate alerts to the corresponding monitoring users.

16 Claims, 25 Drawing Sheets

Related U.S. Application Data

(60) Provisional application No. 62/564,416, filed on Sep. 28, 2017, provisional application No. 62/432,856, filed on Dec. 12, 2016.

(51) Int. Cl.

| | | |
|---|---|---|
| *H04L 12/26* | (2006.01) | |
| *G06F 11/30* | (2006.01) | |
| *H04W 4/029* | (2018.01) | |
| *H04L 29/08* | (2006.01) | |
| *G06F 40/10* | (2020.01) | |
| *G06Q 50/00* | (2012.01) | |
| *H04W 4/38* | (2018.01) | |
| *H04W 4/80* | (2018.01) | |
| *G06F 11/34* | (2006.01) | |
| *G06F 11/32* | (2006.01) | |

(52) U.S. Cl.
CPC ......... *G06F 40/10* (2020.01); *G08B 21/0269* (2013.01); *G08B 21/0272* (2013.01); *H04L 43/08* (2013.01); *H04L 67/22* (2013.01); *H04W 4/029* (2018.02); *G06F 11/3006* (2013.01); *G06F 11/327* (2013.01); *G06F 11/3438* (2013.01); *G06Q 50/01* (2013.01); *H04L 67/18* (2013.01); *H04W 4/38* (2018.02); *H04W 4/80* (2018.02)

(58) Field of Classification Search
CPC ...... G06F 11/30; G06F 11/3013; G06F 17/21; H04L 9/32; H04L 43/08; H04L 67/22
See application file for complete search history.

(56) References Cited

U.S. PATENT DOCUMENTS

| | | | |
|---|---|---|---|
| 8,701,137 | B2 | 4/2014 | Katpelly et al. |
| 9,172,705 | B1* | 10/2015 | Kong .................... H04L 47/801 |
| 9,602,467 | B2 | 3/2017 | Mahadik et al. |
| 2009/0119743 | A1 | 5/2009 | Werner et al. |
| 2012/0117221 | A1* | 5/2012 | Katpelly ............ H04N 21/4135 |
| | | | 709/224 |
| 2013/0104246 | A1* | 4/2013 | Bear ....................... H04L 63/10 |
| | | | 726/28 |
| 2013/0112986 | A1 | 5/2013 | Hsiung et al. |
| 2013/0124192 | A1 | 5/2013 | Lindmark et al. |
| 2015/0032887 | A1 | 1/2015 | Pesek et al. |
| 2016/0119764 | A1* | 4/2016 | Grange ................. H04L 63/102 |
| | | | 455/411 |
| 2016/0294775 | A1 | 10/2016 | Mahadik et al. |
| 2017/0149795 | A1* | 5/2017 | Day, II .................. H04W 4/029 |

\* cited by examiner

500                You are now viewing    Tim         👤 ⓥ logoff

👤 Update Child Information                              Home >Update Child

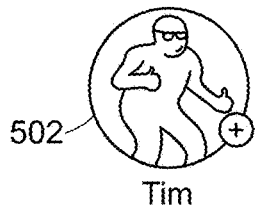
Tim

502

Child Name
Tim                         ⓘ
Date of Birth
October · 15 · 2004 ·
Gender
○ Boy  ○ Girl
Mobile Number
(708) 828-XXXX              ⓘ
Driving Judo
506 → ○ Enable
Driving Judo
Child Device Surrounding Audio Recording Time
508 → 1 Minute
Address
504 { [0]                   ⓘ
City
Malta                       ⓘ
State
----                        ⓘ
Country
----                        ⓘ
Zip code
[0]                         ⓘ
Apple ID
name@gmail.com              ⓘ
Password
*******                     ⓘ
Pairing Code
140308                      ⓘ

[Update]

510 → *Changes

FIG. 5

Change Alert Settings

600

You are now viewing  Tim ▼      logoff

Home > Change

602
General Notification

☐ Call History ⊖
☑ Chat History ⊖
☑ Browser History ⊖
☑ Contacts ⊖
☑ Location ⊖
☑ Photo Monitor ⊖
☑ Facebook App ⊖
☑ Social Media ⊖
☑ instagram ⊖

622
Features Notification

☑ Profanity ⊖
☑ Porn ⊖
☑ Sexting Acronyms ⊖
☑ Nudity ⊖
☑ Bullying Terms ⊖
☑ Suicide Prevention ⊖
☑ Drugs & Alcohol ⊖
☑ Radicalization ⊖
☑ Teen Acronyms ⊖
☑ SnapChat ⊖

Change Alert

**Update Child Information

| Type | Call Time | Visited Websites | Contacts | Address Book Name | Phone Number | Call Duration |
|---|---|---|---|---|---|---|
| ☎ | 29th Nov 2016 23:56:47 | | | N/A | +1401932XXXX | 0:00:16 |
| ☎ | 29th Nov 2016 23:53:22 | | | N/A | +1401932XXXX | 0:00:14 |
| ☎ | 29th Nov 2016 23:47:08 | | | N/A | +1508345XXXX | 0:00:00 |
| ☎ | 29th Nov 2016 23:04:54 | | | N/A | +1508345XXXX | 0:00:00 |
| ☎ | 29th Nov 2016 23:00:04 | | | N/A | +1508345XXXX | 0:00:31 |
| ☎ | 29th Nov 2016 22:40:04 | | | N/A | 504245XXXX | 0:02:11 |
| ☎ | 29th Nov 2016 22:37:17 | | | N/A | +1508345XXXX | 0:00:02 |
| ☎ | 29th Nov 2016 22:36:31 | | | N/A | +1508345XXXX | 0:00:03 |
| ☎ | 29th Nov 2016 22:31:01 | | | N/A | +1508345XXXX | 0:01:26 |

SOCIAL JUDO

Dashboard | Call History | Chat History | Visited Websites | Contacts | Photo Monitor | Social Media | Location Tracker | Installed Apps | Driving/Texting | Time OUT | Alerts You are now viewing Piper Home: Call Log Call Log
Show 25 entries
Search:

| Name | Number | Email |
|---|---|---|
| Alli P | (401) 749-XXXX | N/A |
| Alli P | 401 749XXXX | N/A |
| Allie L | (401) 234-XXXX | N/A |
| Allie L | 401 234XXXX | N/A |
| Alysa | 401-465-XXXX | N/A |
| Alysa | 401465XXXX | N/A |
| Audry ☺ | N/A | name@icloud.com |
| Aunt Joan | (508) 642-XXXX | N/A |
| Aunt Joan | 508 642XXXX | N/A |

Dashboard | Call History | Chat History | Visited Websites | Contacts | Photo Monitor | Social Media | Location Tracker | Installed Apps | Driving/Texting | Time OUT | Alerts You are now viewing Piper
Home: Contacts

SOCIAL JUDO
402

Contacts 1002
Show 25 entries — 1022
1024
1026 — Email
Search — 1030
1000
3:04 PM 12/8/2016

United States Patent 10,777,060 B2

ELECTRONIC DEVICE AND COMPUTER APPLICATION MONITORING, ALERT, AND INTERVENTION SYSTEM AND METHOD

CROSS REFERENCE TO RELATED APPLICATIONS

The present application is a continuation application of U.S. patent application Ser. No. 15/839,726, filed Dec. 12, 2017, which claims priority under 35 USC 119(e) to U.S. Provisional Patent Application Ser. No. 62/432,856, entitled "ELECTRONIC DEVICE AND COMPUTER APPLICATION MONITORING, ALERT, AND INTERVENTION SYSTEM AND METHOD," filed Dec. 12, 2016, and to U.S. Provisional Patent Application Ser. No. 62/564,416, entitled " ELECTRONIC DEVICE AND COMPUTER APPLICATION MONITORING, ALERT, AND INTERVENTION SYSTEM AND METHOD," filed Sep. 28, 2017, which are each incorporated herein by reference in its entirety.

FIELD OF INTEREST

The present inventive concepts relate to the field of electronic monitoring of applications, systems, and functionality enabled or made available via a networked electronic device, and more particularly to monitoring and alert generation of user devices and/or accounts based on electronic data generated from interactions with various social media and other applications, platforms, and functionality available via a user device and/or account. As an example, the inventive concept may be applied in the context of computer technology useful for automated electronic parent monitoring of a child's mobile device.

BACKGROUND

Millions of children have mobile phones or other electronic devices that enable them to engage with social media applications and platforms over the Internet and Worldwide Web (or "Web"). Such social media applications and platforms presently include Facebook, Twitter, Snapchat, Instagram, YouTube, tumblr, flickr, Classmates, Reddit, and Google+. Surely others also exist and will become available over time. Many parents provide mobile phones and other electronic devices having social media access to children as young as elementary school age. The clamor for mobile phones and the like starts at younger and younger ages, and that trend will likely continue.

Psychologists are quickly learning how dangerous smartphones can be for teenage brains. Research has found that an eighth-grader's risk for depression jumps 27% when he or she frequently uses social media. Kids who use their phones for at least three hours a day are much more likely to be suicidal. And recent research has found the teen suicide rates in the US now eclipses the homicide rate, with smartphones as the driving force.

Those on the cutting edge of such technology seem to appreciate the risks of social media better than the general public. According to the 2016 "Kids & Tech: The Evolution of Today's Digital Natives" report, the average age that a child gets their first smartphone is now 10.3 years. However, Bill Gates did not allow his children to have a cellphone until they were the age of 14. Steve Jobs revealed in a 2011 New York Times interview that he prohibited his children's use of Apple's iPad.

While legitimate education and social aspects of social media do exist, there is no doubt that the risks to children are very real. From predators to addictive features intentionally built into such platforms, children are unequipped to appreciate the harm to which they are exposed or to protect against it.

Teenagers that drive have additional risks, caused by distractions such as texting while driving and social media use while driving. The fact is, car accidents are the leading cause of death in teenagers 14-19, and cell phone use while driving is a high risk factor. There are some biological reasons explaining why teens are easily distracted, and the allure of the cellphone while driving can be too much for young drivers to resist.

There is a need for parents to monitor their children's electronic device and social media use. Whether pre-teen or teen age, there are potentially catastrophic risks to children that parents simply should not ignore. To date, however, there has been very little available to parents for responsibly and effectively monitoring their children's use of electronic devices, particularly mobile electronics, and social media.

SUMMARY

In accordance with aspects of the inventive concept, provided is a monitoring and alert system that enables one or more monitoring individuals, e.g., parents, to monitor social media usage, Internet usage, application usage, content, communications, location, and/or other aspects of one or more other monitored users, e.g., their children.

The monitoring and alert system can utilize social media, electronic communications, cellular data, positioning data, and navigation data, as examples, relating to and/or generated from a monitored user's activity on its mobile device to acquire data used to generate alerts to the corresponding monitoring users.

The monitoring and alert system can be implemented as a system comprising central or distributed processing and data storage systems executing one or more computer programs performing various functions of the monitoring and alert system; application programs loaded on mobile devices, and optionally other devices, of the one or more monitored users that communicate with the processing and data storage systems; application programs loaded on the mobile devices, and optionally other devices, of the one or more monitoring users that communicate with the processing and data storage systems; and interfaces to third party systems and data sources that support the functionality and capabilities of the monitoring and alert system.

In various embodiments, the monitoring and alert system can be a cloud or web-based system accessible via the Internet. A monitoring and alert "app," or computer-executable application, may be downloaded on the monitored user's mobile device or devices and configured to communicate with the monitoring and alert system. The monitoring and alert app may be configured to collect data and monitor communications and social media interactions of the user via the mobile device. The app may be configured to intercept communications, content, and/or data determined to be inappropriate or illegal before transmitted by the mobile device and/or before being saved on the mobile device.

The monitoring and alert system can be configured to provide a "portal" (or other user interface) by which a monitoring user can monitor and tailor monitoring of the monitored user and its mobile device. The portal may provide functionality enabling the monitoring user to set parameters and features that customize the monitoring and alerts provided by the system based on interactions with the mobile device.

In various embodiments, the monitoring and alert system is a cloud-based system utilizing distributed processing and data storage systems.

In various embodiments, a monitoring user establishes an electronic account, preferably via a browser interface, on the monitoring and alert system and adds one or more monitored users to the account to enable monitoring and alert generation based on the monitored users' mobile device activities. Various types of information can be input to the monitoring and alert system to enable the monitoring and alert functionality, including inputting a cell phone number of each monitored user's mobile devices and of each monitoring user's mobile device.

In various embodiments, the monitoring and alert system can group the one or more monitoring users with their corresponding one or more monitored users into a virtual private network of users, where only the monitoring users can decrypt data associated with their monitored users and encrypted by the monitoring and alert system and/or app.

In various embodiments, data associated with each monitored user that is stored in the processing and data storage system is encrypted.

In various embodiments, monitoring users have an encryption key or certificate associated with their account that enables decryption of the encrypted data of the corresponding one or more monitored users.

In various embodiments, the monitoring and alert system enables the monitoring user to set parameters for a plurality of monitoring and alert modules that control a set of monitoring and alert functions available via the system.

In various embodiments, the monitoring and alert system includes one or more modules configured to monitor, store data related to, and generate alerts based on use of the monitored user's mobile device relating to one or more of:
1) Calling;
2) Texting;
3) Chatting;
4) Web sites surfed or visited;
5) Contacts;
6) Camera usage (Photo monitoring);
7) Social media interactions;
8) Location tracking/Navigation;
9) Driving; and/or
10) Installed applications (apps) usage.

In various embodiments, the monitoring and alert system monitors various forms of data and communications transmitted and/or received by the mobile device.

In various embodiments, the monitoring and alert system is configured to intercept data and communications transmitted and/or received by the mobile device.

In various embodiments, the monitoring and alert system app stored on the monitored user's mobile phone includes a nudity-monitoring module configured to do at least one of:
1) detect nudity in images received by the mobile device;
2) detect nudity in images taken with a camera of the mobile device;
3) encrypt images taken with the camera of the mobile device and store the encrypted images in a hidden folder;
4) prevent transmission of images having detected nudity; and/or
5) generate and transmit an alert to the monitoring users when nudity is detected.

In various embodiments, the monitoring and alert system can be configured to block out and/or redact detected nudity from an image.

In various embodiments, the monitoring and alert app can be configured to transmit the redacted image to the monitoring and alert system for review and approval or rejection by the monitoring users via the account portal, wherein approval indicates that the image was incorrectly flagged as including nudity and rejection indicates that the image was correctly flagged as having nudity. Approval can cause the system to communicate with the app on the mobile device to treat the image as if it does not include nudity. Rejection can cause the system to communicate with the app on the mobile device to delete the image containing nudity.

In various embodiments, the monitoring and alert app stored on the monitored user's mobile device includes a profanity-monitoring module configured to monitor at least text communications for one of a plurality of predefined profane terms or phrases.

In various embodiments, the monitoring and alert system app stored on the monitored user's mobile phone can be configured to monitor communications, e.g., texts, posts, voice data, and so on, for profanity, indications of bullying, indications of planned or imminent bodily harm to self or others, and/or indications of planned or imminent illegal activity. Such monitoring can analyze mobile device data for the presence of predefined terms, phrases, symbols, or other indicia indicating an actual or potentially dangerous or illegal activity or behavior.

In various embodiments, the monitoring an alert system can be configured to monitor the monitored user's use of the mobile device while driving, including selectively disabling mobile devices features when a target (or threshold) driving speed is reached, e.g., an automobile driven by the monitored user.

In various embodiments, the monitoring and alert system can be configured to prohibit (e.g., disable) texting, calling, image taking, Web browsing, social media use, and other apps use while driving. The monitored user app and/or system may allow, however, the use of a navigation app on the monitored user's mobile phone.

In various embodiments, the system or monitored user app may allow exceptions from the prohibited use, such as selectively allowing the mobile phone to make phone calls to known parent phone numbers and emergency numbers (e.g., 911).

The inventive concept is generally described in the context of a parent monitoring its minor child's use of a mobile device, such as a child under 18 years of age. In such cases, the minor child is the monitored user. However, the inventive concept may have similar applicability in other contexts when it is necessary or useful to monitor another type of individual's use of social media, the Internet, location, and so on. For example, a monitored user could be an individual that is disabled, mentally ill, suicidal, a subject of a study, at risk for criminal or harmful behaviors, legally required to be monitored, medically required to be monitored, or for which such monitoring is otherwise useful or necessary. Any of such individuals could be a monitored user in different contexts.

For simplicity, mobile phones, tablets, phablets, as well as any other portable electronic device with network communications and/or Internet and social media capability, will be referred to as a "mobile device" or, if more than one, "mobile devices."

While the inventive concept is generally explained in the context of a monitored user's use of a mobile device, e.g., a mobile phone, it should be appreciated that the invention can, in some embodiments, be applied to similar uses of laptops, computers, networked entertainment devices, and the like.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 4-24 are examples of interactive display screens that can be generated via a parent portal by the monitoring an alert system.

DETAILED DESCRIPTION OF PREFERRED EMBODIMENTS

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Figure 1:
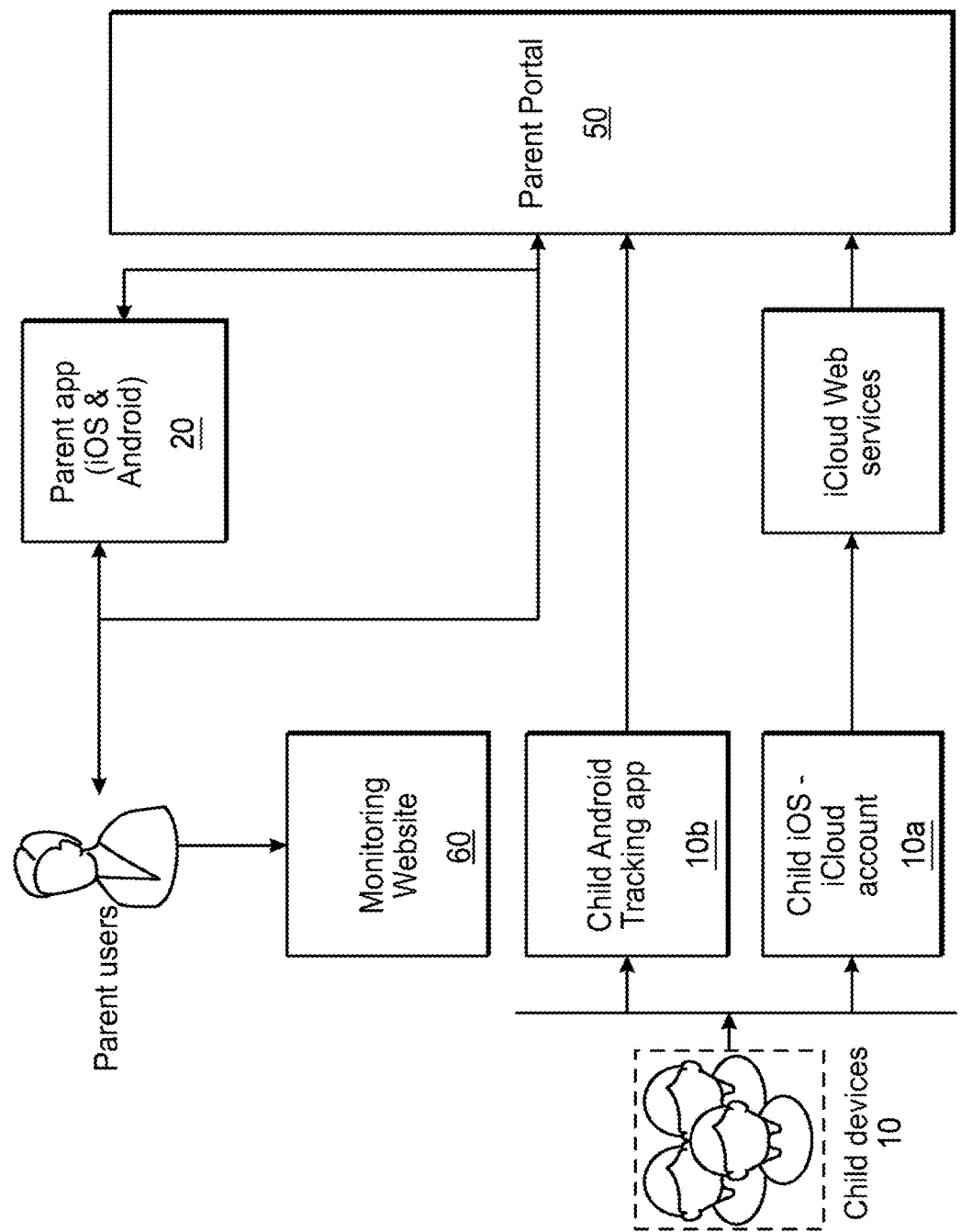
FIG. 1 is a block diagram of an embodiment of a monitoring and alert system, in accordance with aspects of the inventive concepts.

FIG. 1 is a block diagram of an embodiment of a monitoring and alert system, in accordance with aspects of the inventive concepts. In one implementation, the monitoring and alert system is implemented as a cloud-based system, with distributed processing and data storage. Occasionally, the monitoring and alert system may be referred to in the text and/or drawings as Social Judo™, which is a trademark of K&M Bristol Holdings, LLC of Massachusetts.

As an example, in one embodiment, the monitoring and alert system is configured to allow a monitoring user (e.g., a parent), via its mobile phone 20, to monitor one or more monitored user's (e.g., his/her child or children) smartphone (s) 10 in real-time with a cloud-based analytics engine 60 that generates alerts to parents in real-time. The monitored user's smartphone 10 can be an iPhone 10a, Android phone 10b, or other such device. In this embodiment, a "parent portal" 50 is the access point for the parents to access the monitoring an alert system, which is in communication with a monitoring and alert app stored on the child's iPhone 10a and/or Android phone 10b, as a monitored user app. Similarly, a monitoring and alert app is stored on the parent's iPhone and/or Android phone 10, as a monitoring user app. Each app communicates with the cloud-based monitoring and alert system processors and data storage systems and devices to enable the parents' insight into a variety of aspects of the child's mobile device 10 use and to receive alerts when such use indicates a potential or actual undesirable or harmful activity occurring via the child's mobile phone.

Figure 1B:
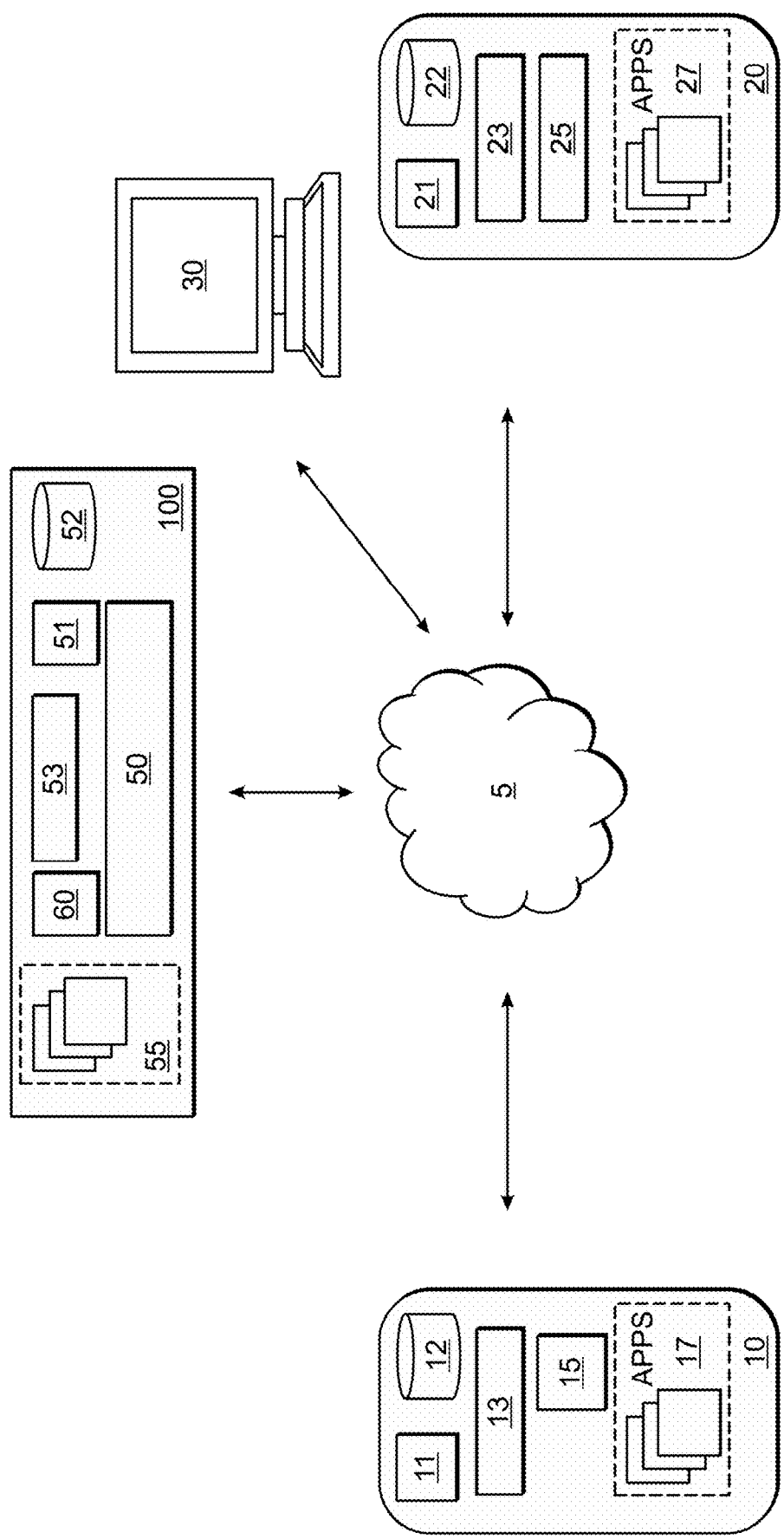
FIG. 1B, is a block diagram of an embodiment of a monitoring and alert system, in accordance with aspects of the inventive concepts.

Referring to FIG. 1B, provided is block diagram of an embodiment of a monitoring and alert system 100, which includes processors 51, data storage devices 52, and computer program code that is executable to provide a Web browser accessible system configurable by monitoring users (e.g., parents) to monitor and control, e.g., via a mobile device 20, mobile devices 10 of selectively entered monitored users (e.g., their children). For example, mobile device 20 can be the smartphone of one or both parents and mobile device 10 can be the smartphone of one or more of their children. The parent portal 50 is a set functional modules that provide a web interface to parents seeking to set-up, monitor and control their children's mobile device 10. The parent portal 50 provides access to a suite of functional modules 55 having specific control and alert options.

A monitoring user can interact with the monitoring and alert system 100 in different ways. For example, the monitoring user could login to the parent portal 50 through a Web browser from a computer 30, e.g., laptop, desktop computer, tablet, etc., to establish an account, enter information relating to setting up monitored users, and/or set parameters for monitoring, alerts and control of the monitored user's mobile device. In accordance with the account setup, alerts could be sent to the monitoring user's mobile device 20.

The monitoring user's mobile device 20 can include a monitoring and alert system application 25, in addition to including at least one processor 21, at least one data storage device 22, and an operating system 23, as well as other applications (APPS, 27) loaded on the mobile device. Such APPS 27 can include applications for texting, web browsing, email, camera, photos, cell phone, navigation, social media apps, and so forth. The monitoring and alert system app 25 can communicate with the monitoring and alert system 100 to access the user's account and settings. In some embodiments, the monitoring and alert system app 25 can receive alerts from the monitoring and alert system 100, e.g., generated in response to communications with the mobile device 10 of a monitored user based on the monitored user's interaction with apps, location, and so forth, as examples. In some embodiments, the monitoring and alert system app 25 can receive alerts from the monitoring and alert system app 15 on the monitored user's mobile device 10, e.g., generated in response to the monitored user's interaction with apps, location, and so forth.

The monitored user's mobile device 10 can include at least one processor 11, at least one data storage device 12, an operating system 13 and applications (APPS 17) loaded on the mobile device 10. Such APPS 17 can include applications for texting, web browsing, email, camera, photos, cell phone, navigation, social media apps, and so forth. A monitoring and alert system app 15 is also loaded on the mobile device 10. The monitoring and alert system app 17 can interact with the OS 13, as well as processor(s) 11 and data storage device(s) 12 to monitor the user's interaction with the apps 17. The monitoring and alert system app 15 implements the account settings in the monitoring and alert system 100 set through the parent portal 50, and can interact with the OS for monitoring incoming and outgoing data to and from the APPS 17. The monitoring and alert system app 15 can, therefore monitor usage of and data exchange with the apps 17.

Figure 2:
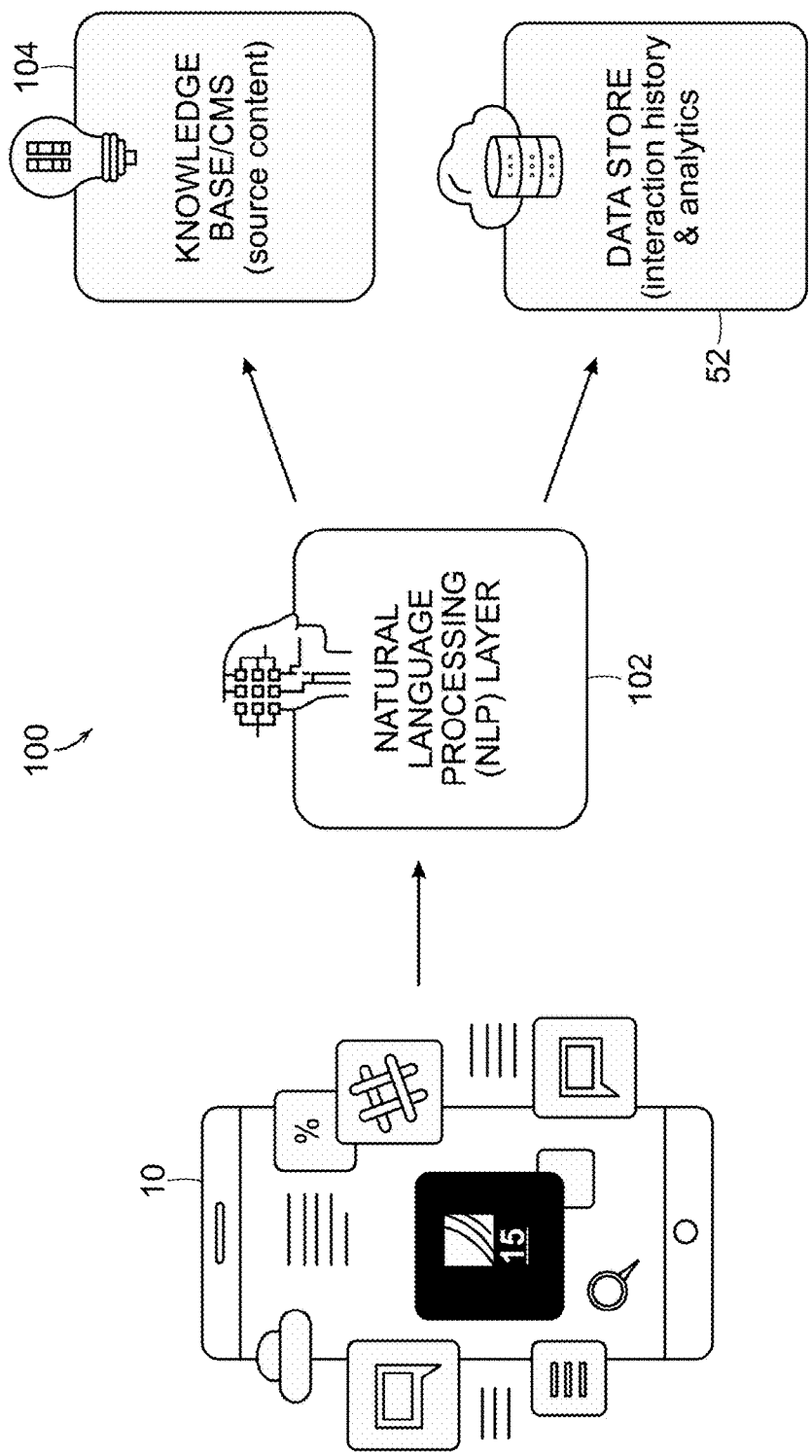
FIG. 2 is a block diagram of an embodiment of artificial intelligence "bots" usage in the monitoring and alert system.

Referring to FIG. 2, in the preferred form the monitoring and alert system utilizes a plurality of artificial intelligence (AI) "bots" for monitoring and alert generation. A bot can be a software application that runs automated tasks (scripts) over the Internet. These bots help provide processing and analysis that is feedback into the system to provide system learning. The cloud-based monitoring and alert system 100 can include a natural language processing (NLP) module 102 that processes data from the mobile device APPS 17, while interacting with a knowledge base 104 containing a core set of knowledge used by the system 100 and a data store of information (in data storage device(s) 52). The NLP 102 pulls responses from the knowledge bases 104 and data store 52, which continues to build overtime as the system 100 learns. Learning takes place, at least in part, using the AI bots which store knowledge and data as new situations are encountered and resolved. The learning can, for example, build a database of terms, phrases, graphics, and the like for determining inappropriate, offensive, and/or illegal content being received by or intended to be sent from the monitored device 10. By continually expanding its data set and vocabulary, the monitoring and alert system adapts to trends for detecting content indicative of nudity, bullying, radicalization, and the like.

Figure 3:
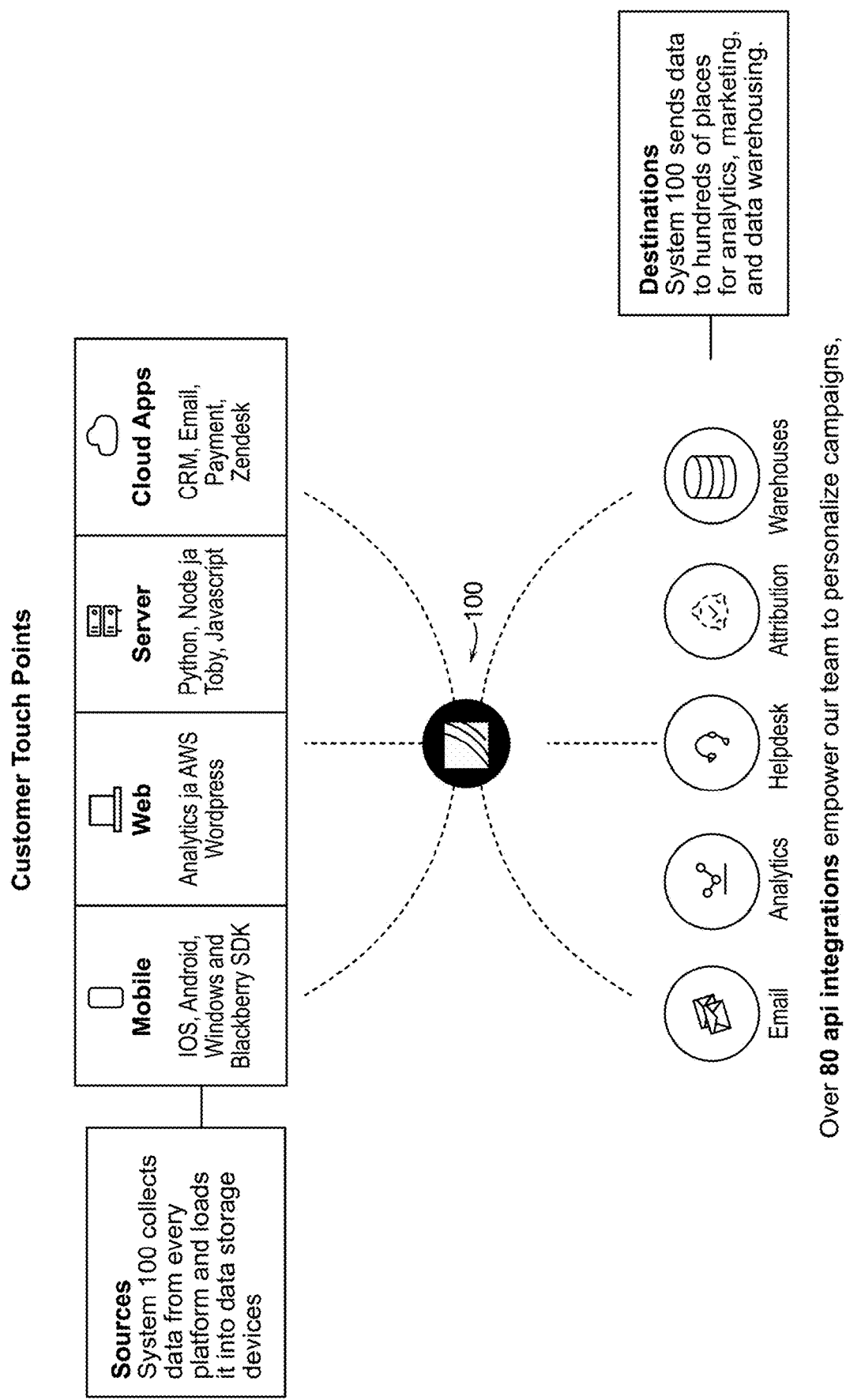
FIG. 3 is a block diagram of an embodiments user interactions with the monitoring and alert system.

FIG. 3 is a block diagram showing a set of customer "touch points" with the monitoring and alert system 100, in accordance with an embodiment of the inventive concept. The center "Social Judo" icon represent access to the monitoring and alert system 100 by any one or more of a plurality of different users, applications, data and/or information sources, and so on, that interface with the monitoring and alert system 100. Data is collected from these various platforms, such as mobile devices 10, 20 and loaded into the monitoring and alert system 100.

Data from the monitoring and alert system 100 is sent to various systems and applications for analytics, warehousing, help desks that interface with user devices 10, 20 to resolve issues and communications (e.g., email) back to users.

In one embodiment, the monitoring and alert system 100 is represented as an evidence grid comprising a plurality of nodes. Each node in the evidence grid contains a certain amount of knowledge. Each node could define a certain set of knowledge types, which are populated with values (evidence) to build and update the evidence grid.

In an embodiment, each mobile device 10, 20 can be considered a node in the evidence grid. For example, the mobile devices of two parents 20 and their children 10 can each be considered a node of the evidence grid. Collectively, this family of nodes can be considered a network of nodes, within a larger network of nodes comprising the evidence grid. Communications and/or data among a family network can be secure, with data of child (monitored) user devices 10 being encrypted and only capable of decryption by the parent (monitoring) user devices 20, which possess the necessary key or certificate needed to decrypt their children's encrypted data.

As an evidence grid, data can be associated with each node, such as each mobile device. As an example, for a child's mobile device 10, a parent can input some data associated with the child device node. The installed app 15 in conjunction with the distributed monitoring and alert system 100 can collect and analyze data from the child's mobile device 10, which is also associated with the node. The data, or "evidence" associated with such nodes can be continually processed and analyzed by the system 100. Parents get insight into the node, and its data, through the parent portal 50. In a preferred embodiment, the parents can access and receive alerts from the monitoring and alert system 100 via the parent portal 50, which can be accessible via the app 25 on the parent's mobile device 20. Otherwise, a parent can access the parent portal 50 via a Web interface from any of a number of devices having access to the Internet, such as computer 30.

In accordance with one aspect of inventive concept, the system comprises a plurality of range sensors, which can be implemented as AI bots, configured to collect data, a data storage system having storage capability within its unique cloud, referred to as the "Social Judo Cloud™" (SJC), representing an environment comprising the users. Such storage capability is represented by data storage devices 52.

In various embodiments, the system 100 can include a range of configurations that allow for a data collection and a data storage system 100 that incorporates encryption and compression having stored in the evidence grid. The data storage and encryption functionality can enable secure storage of each monitored user's data. The evidence grid can be a model representing a set of adjustable parameters and range sensors, where each mobile device can be a range sensor. In various embodiments, therefore, the monitoring and alert system 100 can be implemented to represent a sensor model with parameters that are adjustable through the electronic portal. That is, the range sensors (mobile devices 10) can have parameters that can be adjusted via the parent portal 50 of the system 100.

Various aspects of the present invention include a database interaction system with compression and encryption methods comprising: a display, a set of user input devices, and a database comprising a data set including a plurality of fields and associated field values; a graph model configured to define a plurality of nodes and states. Each node (mobile device) representing a field from the plurality of fields; a graph-to-data mapper configured to map the field values to states contained in the nodes of the graph model; and a graphical interface module configured to generate for display to the parent phone one or more nodes from the plurality of nodes, wherein a display of a node includes a graphical representation of field values associated with a specific field represented by the displayed node and state contained therein.

Many graphical user interfaces have been developed for presenting the contents of the database. Such systems include statistical packages such as SAS and SPSS, statistical crosstab analysis packages such as Quantum, business intelligence systems such as Hyperion and data mining systems such as SAS Enterprise Miner.

Another approach to presenting the contents of the database to the parent is to present data and metadata in tabular or spreadsheet-like views. In the case of data, each cell can contain a value or values of a field for a particular record. In the case of metadata, each column can represent a property for the field, where each cell contains a value for the property for that field.

Although this application allows the monitoring user to specify a set of inclusion criteria and formatting of the graphical data representing a query, the graphical summaries are essentially static depictions, and they generally do not allow the user to query the data itself in the graphical interface.

FIGS. 4-18 are examples of interactive display screens that can be generated via a parent portal by the monitoring an alert system. As discussed above, the parent portal 50 provides access to a suite of functional modules 55 having specific control and alert options. The screens in FIGS. 4-18 are the interface to parents provided by the parent portal. The icons in a top region of the screens represent different functional modules 55.

Figure 4:
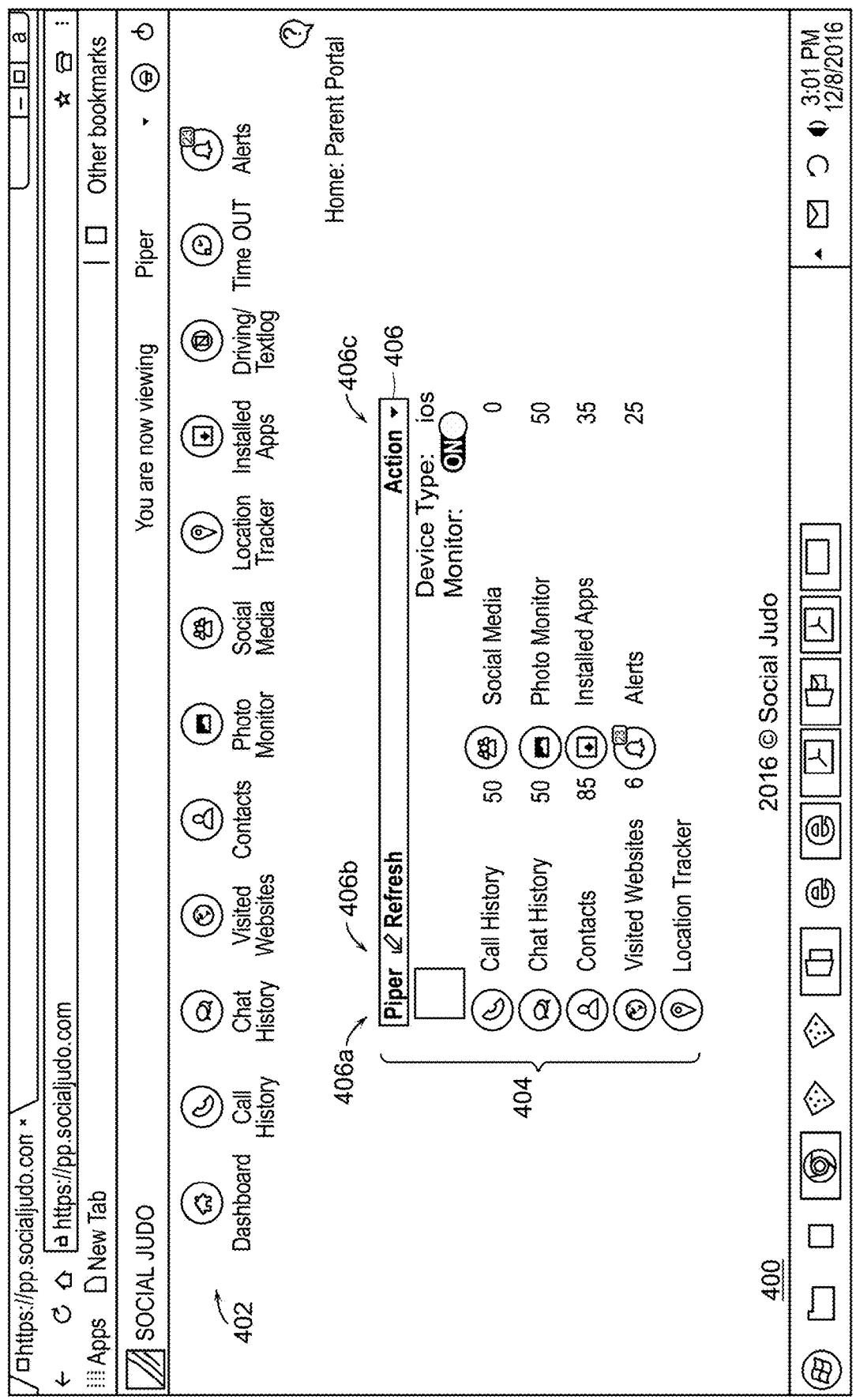

FIG. 4 presents a dashboard view screen 400, which includes a set of user-selectable icons dispersed along a top region 402 of the screen. Each icon represents a different set of functions for control, monitoring and alerts of the monitored user mobile device 10.

In this dashboard view, a primary region 404 shows the main content of the selected dashboard screen. The primary region 404 includes a header 406 showing the monitored user's name 406a, a pencil icon 406b, and an action icon 406c. Each of icons 406b and 406c is active and selectable. When selected, icon 406b opens an Edit Child Device pop-up box inviting the user (e.g., parent) to update child information, change alert settings or personalize alerts for that child. Selection of the update child information yields a screen with a plurality of settings specific to this child within the monitoring and alert system 100.

FIG. 5 is an embodiment of an Update Child Information screen 500. This screen can be used to upload a picture 502 of the child. This screen also provides fields 504 for entering the child's name, date of birth, cell phone number, address, Apple ID and password. An "Enable Driving Judo" 506 radio button is provided to activate certain driving monitoring features and alerts associate with cellphone indicated by the entered cellphone number. A "Child Device Surrounding Audio Recording Time" field is provided that enable the parent to set an amount of time for recording audio from the child's mobile device 10—here the default is 1 minute. But other increments could also be used, e.g., 3 minutes, 5 minutes or 10 minutes. The monitoring and alert system enables a parent to record the surrounding from the child's mobile device 10, where the system can send the audio file to the parent's mobile device 20. A change alert settings button 510 allows the parent to change and update alerts for the child's mobile device.

FIG. 6 is an example of a Change Alert Setting screen 600 yielded when the change alert setting button 510 is selected in the screen 500 of FIG. 5. In this embodiment, the column on the left 602 is titled "General Notification" and the column on the right 622 is "Feature Notification." Each column includes a set of selectable notifications that can be turned on or off. Column 602 includes these selectable notifications (or alerts): Call History, Chat History, Browser History, Contacts, Location, Photo Monitor, Installed App, Social Media, and Instagram. . Column 622 includes these selectable notifications (or alerts): Profanity, Porn, Sexting Acronyms, Nudity, Bullying Terms, Suicide Prevention, Drugs & Alcohol, Radicalization, Teen Acronyms, and Snapchat.

The Call History notification provides alerts for to/from the mobile device 10. The Chat History notification provides alerts for recent chat activity using the mobile device 10. The Browser History notification provides alerts for recent Web browsing activity using the mobile device 10. The Contacts notification provides an alert if the child adds a new contact to the mobile device 10. The Location notification provides an alert regarding the location of the mobile device (e.g., in a forbidden or dangerous location). The Photo Monitor notification provides alerts on recent photos taken with the mobile device 10. The Installed App notification provides alerts on apps recently added to the mobile device 10. The Social Media notification provides alerts on recent social media activity with the mobile device 10. The Instagram notification provides alerts on recent information about Instagram use with the mobile device 10.

The Profanity notification provides alerts of profanity on the mobile device 10. The Porn notification provides alerts on recent activity related to pornography use with the mobile device 10. The Sexting Acronyms notification provides alerts on recent use of sexting acronyms with the mobile device 10. The Nudity notification provides alerts on nudity in photos taken with, downloaded, or sent to the mobile device 10. The Bullying Terms notification provides alerts on recent use of bullying terms with the mobile device 10. The Suicide Prevention notification provides alerts on recent use of or content on the mobile device 10 relating to possible suicide intentions. The Drugs & Alcohol notification provides alerts on recent use of the mobile device 10 related to drugs or alcohol. The Radicalization notification provides alerts on recent use of the mobile device 10 indicating radicalization, such as content including radicalizing audio, text and/or video. The Teen Acronyms notification provides alerts on recent use of teen acronyms with the mobile device 10. The Snapchat notification provides alerts on recent information about Snapchat use with the mobile device 10.

Returning to FIG. 4, the action icon 406c in the primary region 404 is provided to enable ease removal of the monitored child, via a drop down menu with a "Remove" option. The remaining icons in the primary region 404 represent selectable links to screens available though the top region 402, e.g., Call History, Chat History, Contacts, Visited Websites, Location Tracker, Social Media, Photo Monitor, Installed Apps, and Alerts. To the right of each icon in a number indicating a count associate with the icon. For example, the user has 50 calls in Call History, 50 chats in Chat History, 85 Contacts, 8 Visited Websites, 0 Social Media interactions, 50 photos, 35 Installed Apps, and 25 Alerts. Selection if an icon causes generation and rendering of a new screen, as discussed below.

In FIG. 7, the Call History icon 702 in the top region 402 has been selected to render the call history screen 700. This screen 700 shows the call history of the mobile device 10 in table form, with relevant information displayed, as shown. The first column 712 shows if the call was made or received, as a call type. The second column 714 shows the call time and date. The third column 716 shows of the call was from/to someone in the address book of the mobile device 10. The fourth column 718 shows the phone number of the other phone. And the fifth column 720 shows the call duration.

Figure 8:
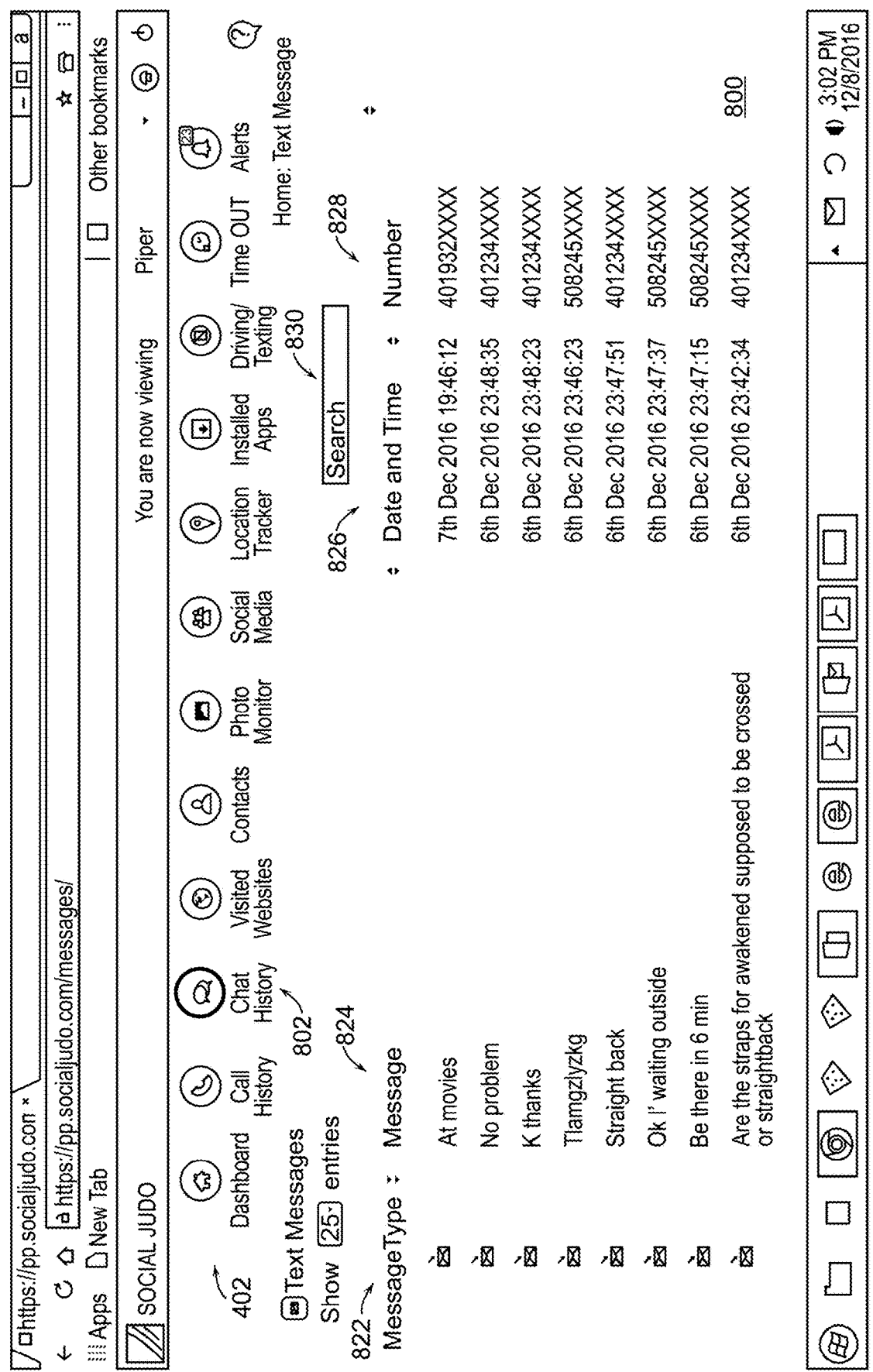

In FIG. 8, the Chat History icon 802 has been selected to render the chat (or text) history screen 800. This screen 800 shows the chat history of the mobile device 10 in table form, with relevant information displayed, as shown. The first column 822 shows an icon indicating to the text/message, was sent or received by the mobile device 10. A second column 824 shows the content of the message, e.g., the first message says "At movies." A third column 826 shows the date and time of the message. A fourth column 828 shows the number to which the message was sent/received. A search field 830 is included that enables the user (parent) to search for keywords or phone numbers, as examples.

Figure 9:
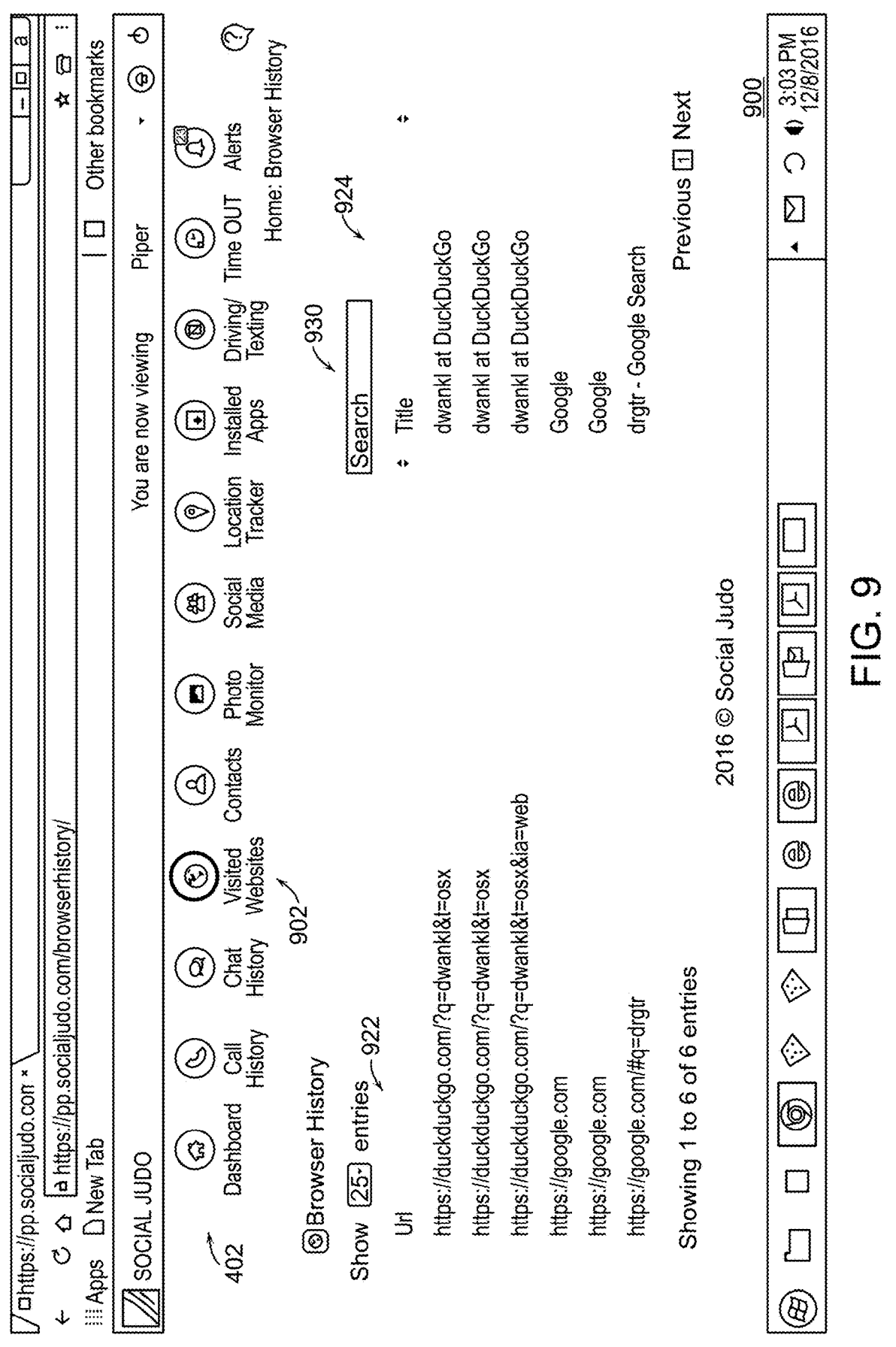

In FIG. 9, the Visited Websites icon 902 has been selected to render a web sites visited screen 900. This screen shows the web sites visited via the mobile device 10, which are shown in table form, with relevant information displayed, as shown. A first column 922 shows a URL visited by the mobile device 10. A second column 924 indicates a title of the web page. A search field 930 is included that enables the user (parent) to search for certain key words or web pages, as examples.

In FIG. 10, the Contacts icon 1002 has been selected to render the contacts saved screen 1000 on the mobile device, which are shown in table form. A first column 1022 shows a name of the contact. A second column 1024 shows a phone number of the contact. And a third column 1026 shows an email address of the contact. A search field 1030 is included that enables the user (parent) to search for certain key words or contacts, as examples.

Figure 11:
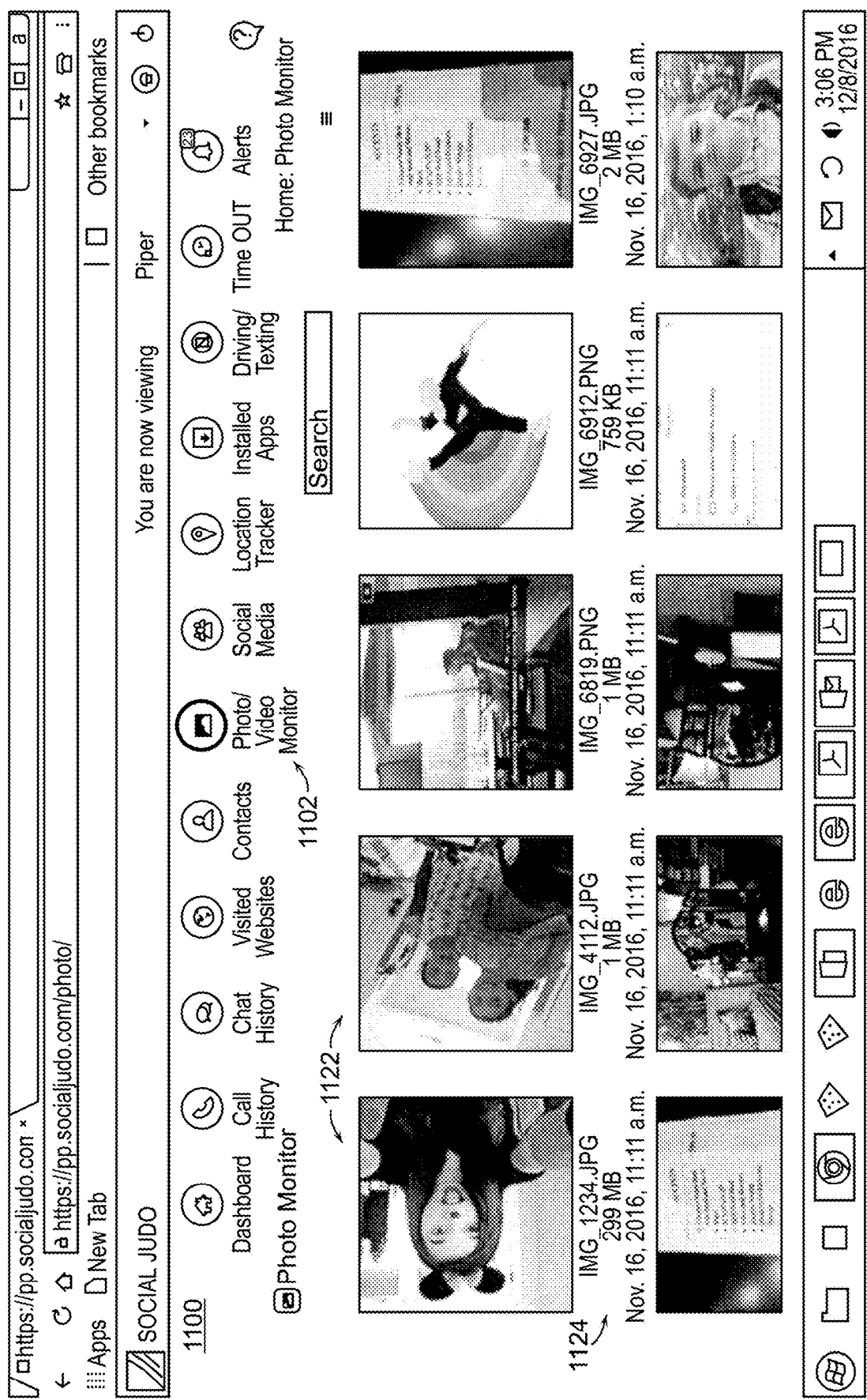

In FIG. 11, the Photo/Video Monitor icon 1102 has been selected to render a screen 1100 showing photos and videos taken by and/or saved on the mobile device 10. The photos/videos 1122 are shown in a thumbnail form, with relevant information displayed, as shown. In this embodiment, below each photo/video is a set of related data 1124, e.g., file name, file size, and the date and time the phot was taken. In some embodiments, the place where the photo/video was taken could also be shown.

Figure 12:
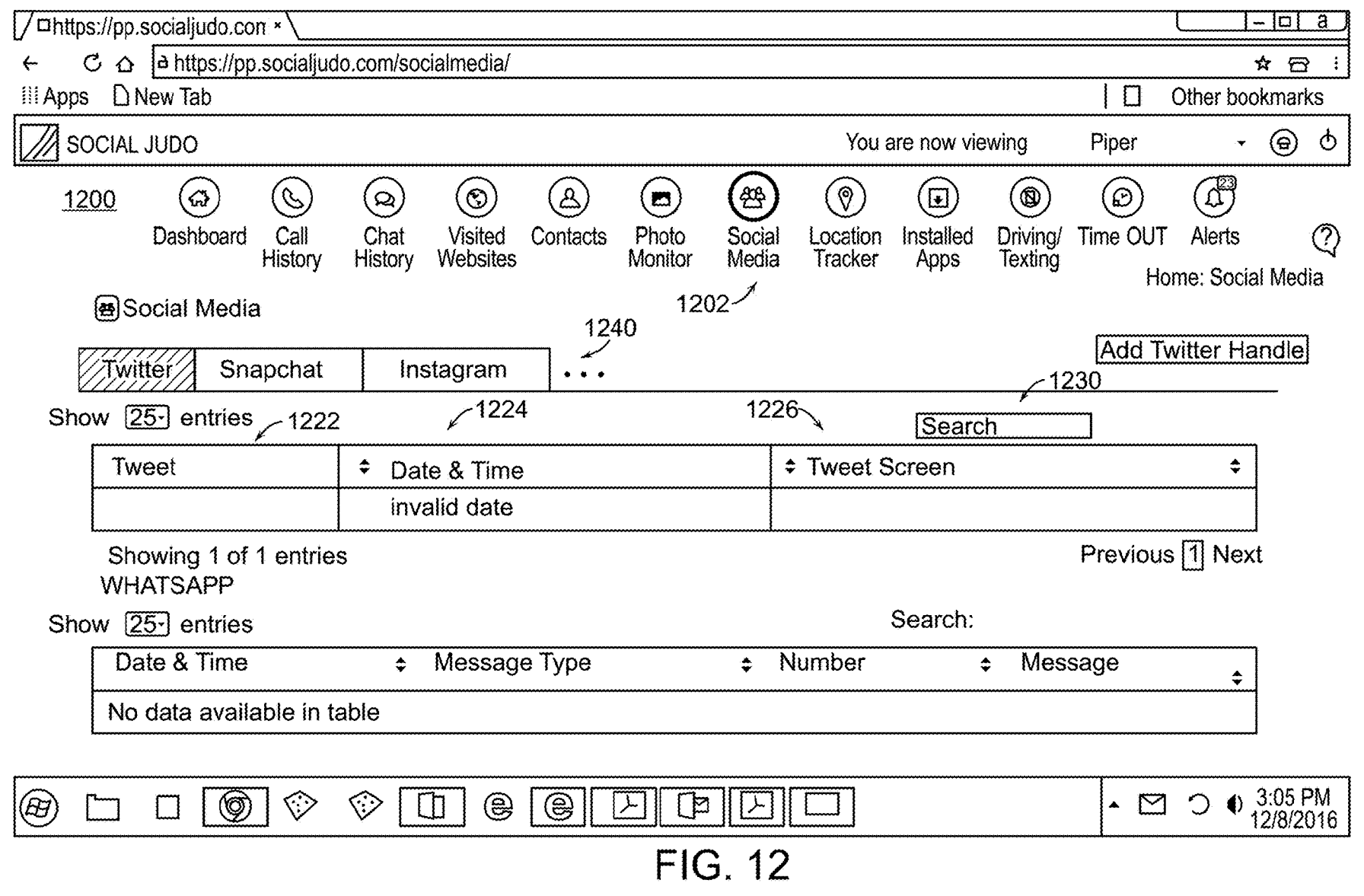

In FIG. 12, the Social Media icon 1202 has been selected to render a social media activity screen 1200. This screen 1200 shows the social media activity of the user, e.g., tweets, via the mobile device 10, which is shown in a list form, with a plurality of social media platforms shown in this example. That is, in this example, Twitter and WhatsApp are two different social media platforms showing activity. For each platform, a specific table of information can be rendered. For example, for Twitter a table having a first column 1222 shows the tweet content. A second column 1224 shows the date and time of the tweet. And a third column 1226 shows a tweet screen name is shown. A search field 1230 is included that enables the user (parent) to search for certain key words or tweet screen name, as examples. A set of social media tabs 1240 can be provided to enable a user to quickly change the presentation from one social media type to another. Here Twitter is selected, and Snapchat and Instagram are not selected.

Figure 13:
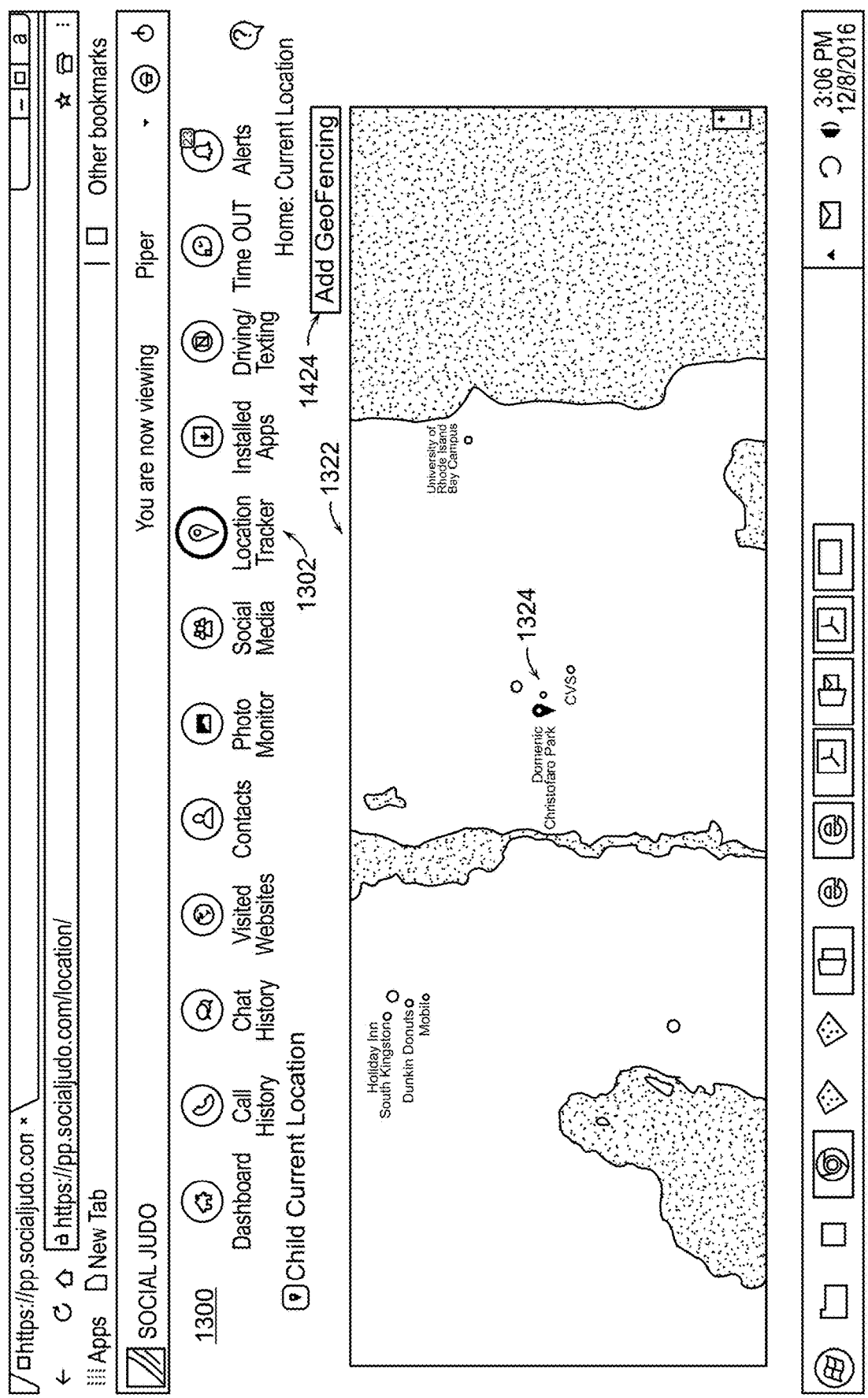

In FIG. 13, the Location Tracker icon 1302 has been selected to render a screen 1300 having a map 1322. This screen 1300 shows the location 1324 of the mobile device 10 on the map 1322.

Figure 14:
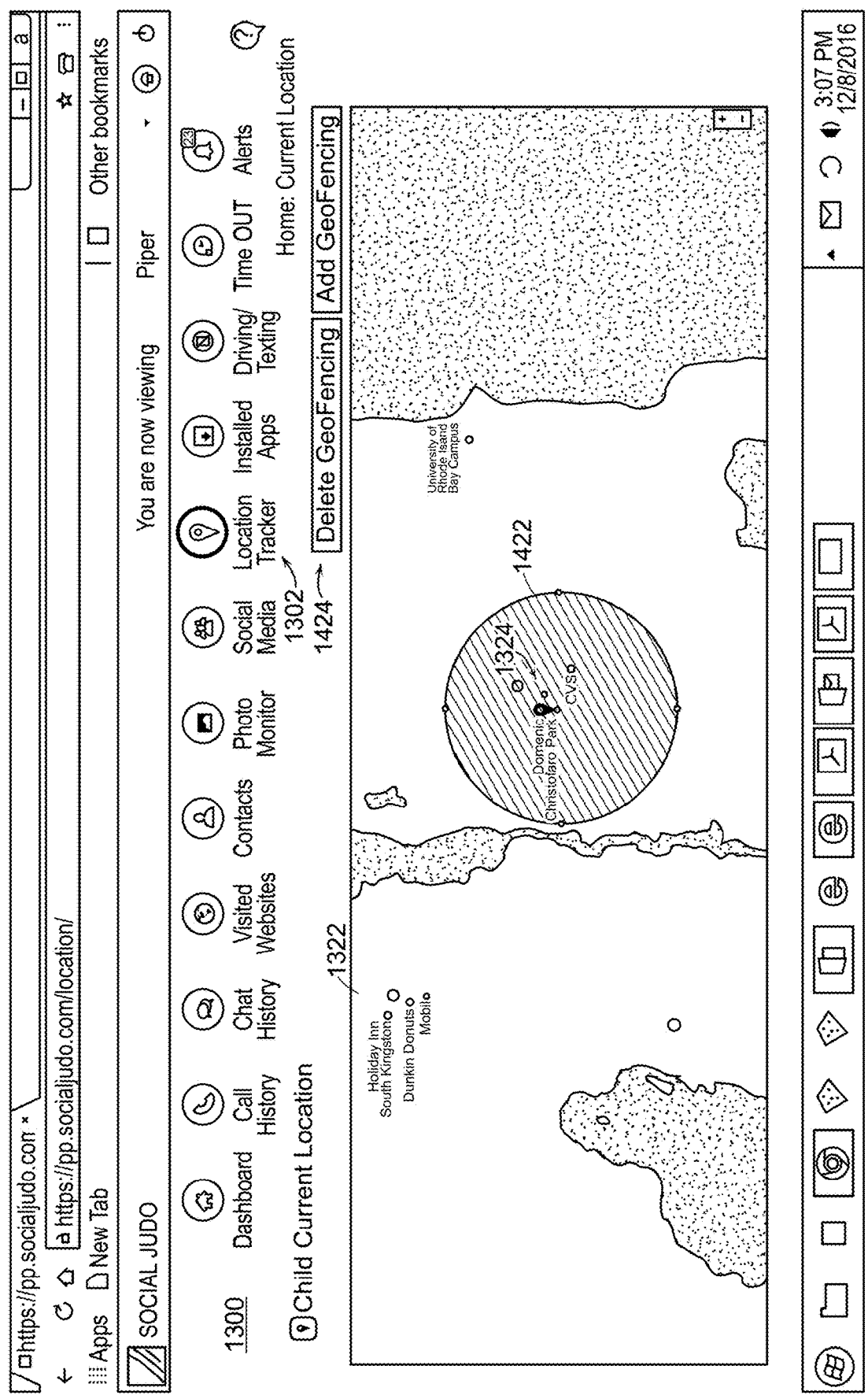

In FIG. 14, is also the Location Tracker screen 1400 and map 1322 showing the location 1324 of the mobile device 10 on the map 1322. A user interactive device allows the parent to establish safe and unsafe zones 1422 for the monitored child. Here a user selectable button called "GEO FENCING" 1424 is provided for this purpose.

Selecting the GEO FENCING button opens a pop-up that enables the user to enter an address or location and a radius for a safe or unsafe zone. In FIG. 14 the larger area 1422 is shown as a safe zone. Since the user is in a safe zone, an alert is not generated to the parent device by the monitoring and alert system. A safe zone can be color coded green, as an example.

Figure 15:
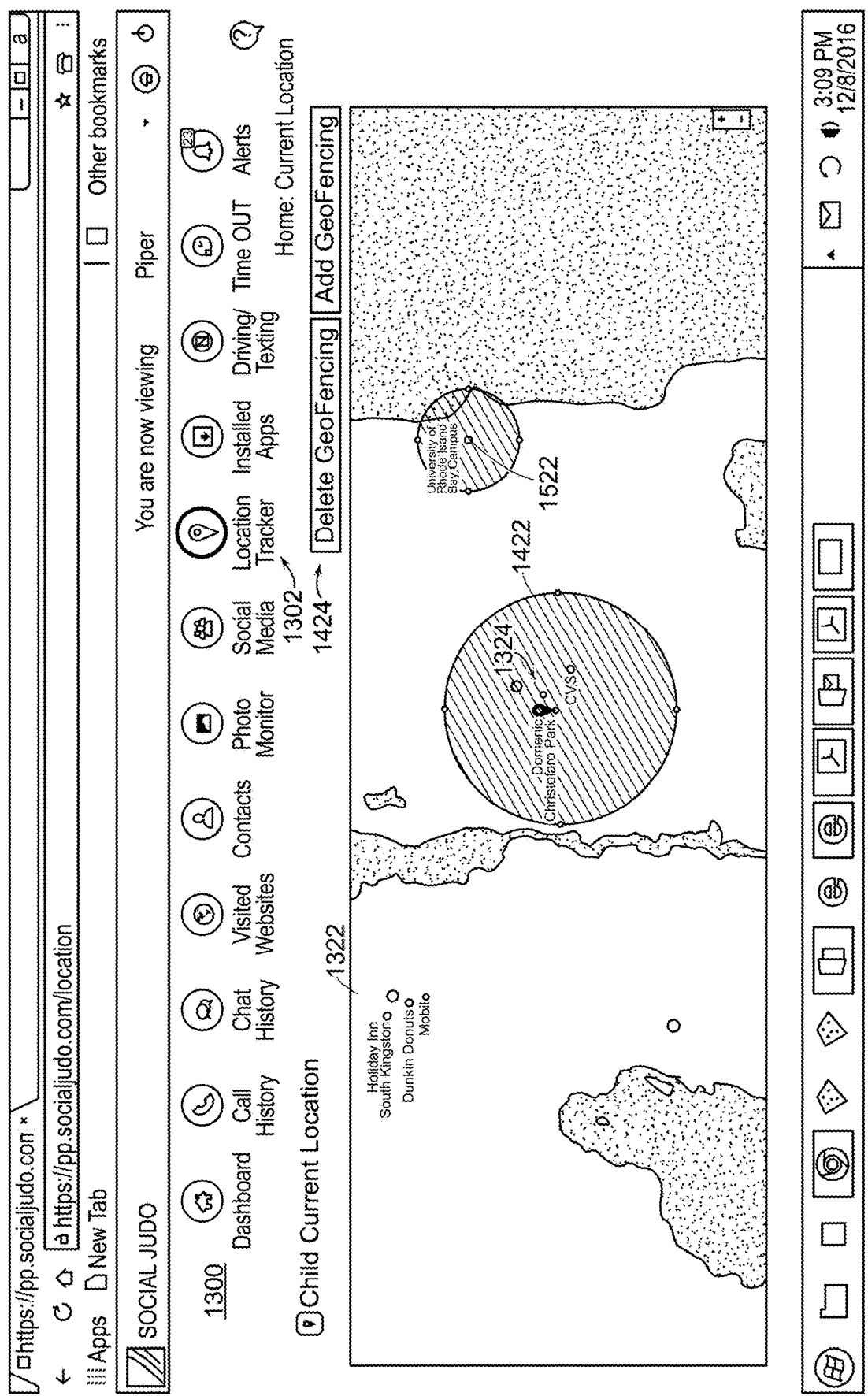

In FIG. 15, the screen is shown with an unsafe zone 1522, shown as a smaller circle. An unsafe zone is entered like a safe zone, i.e., with an address or location and a radius for defining the zone. If the user's mobile device 10 enters an unsafe zone, the monitoring and alert system generates an alert to the parent mobile devices 20. An unsafe zone can be color coded red, as an example.

In other embodiments, safe and unsafe zones could be defined by graphical interaction with the map.

Figure 16:
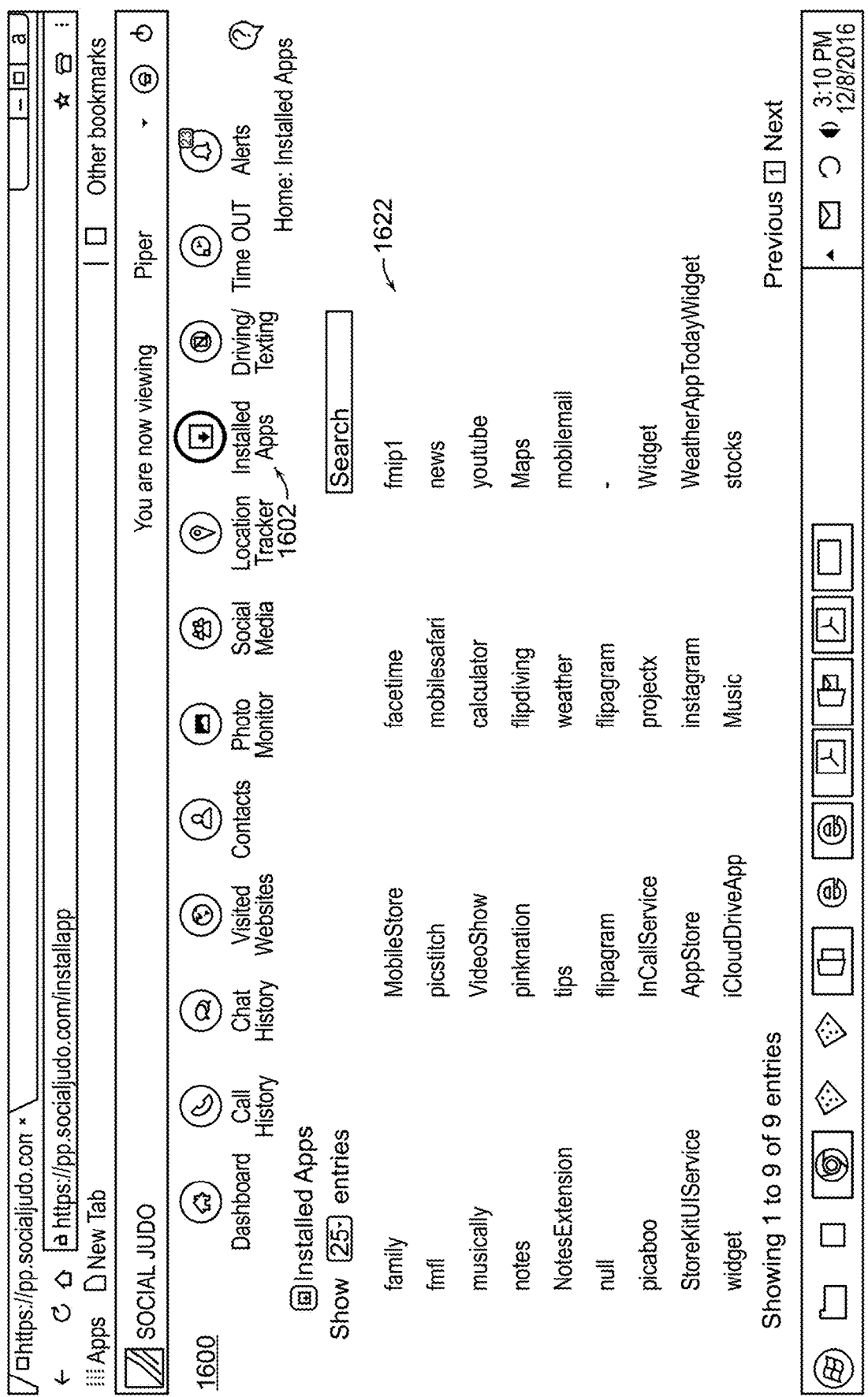

In FIG. 16, the Installed Apps icon 1602 has been selected to render a screen 1600 having a listing of applications 1622 installed in the child's mobile device 10.

Figure 17:
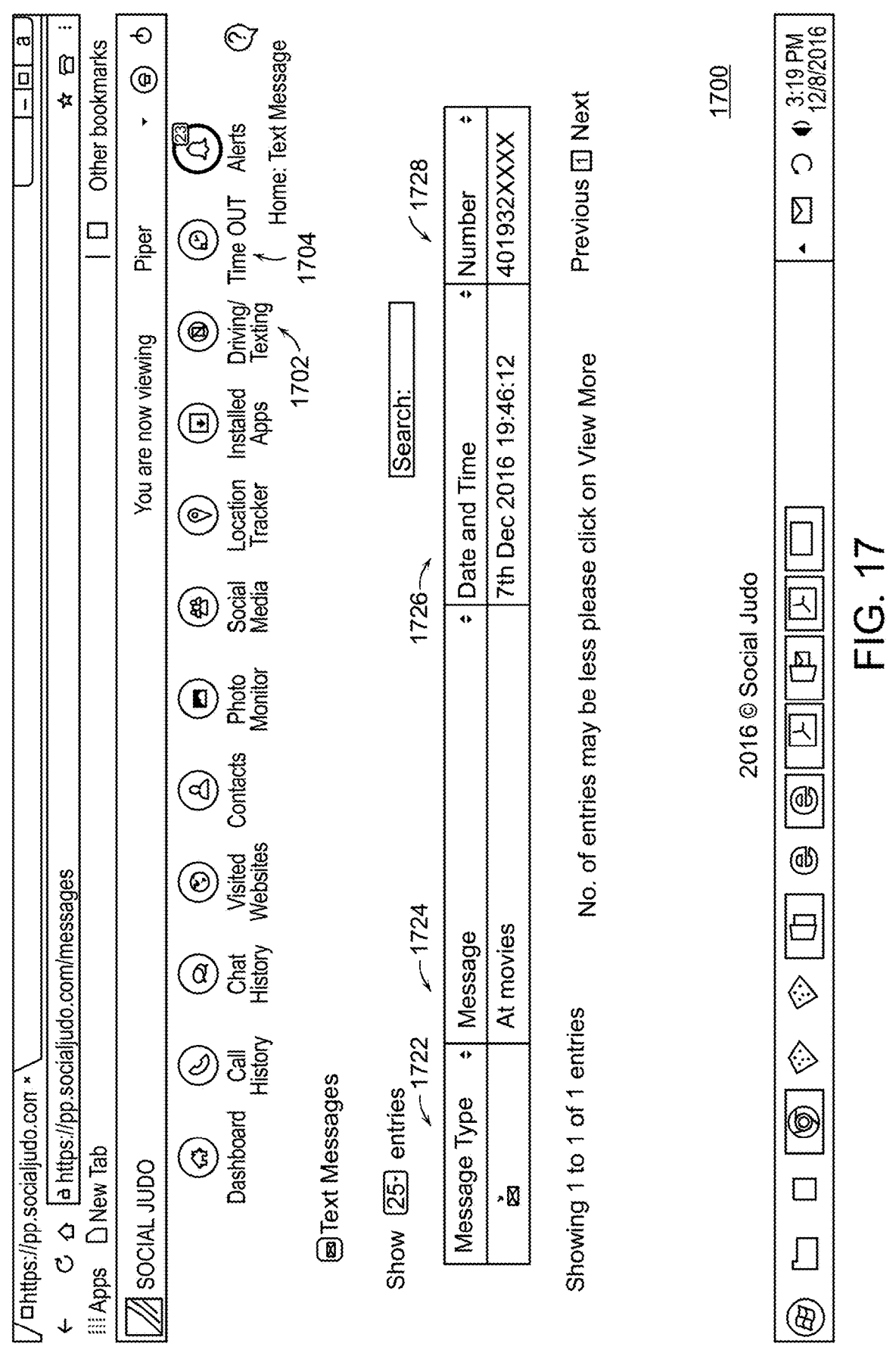

In FIG. 17, the Driving/Texting icon 1702 has been selected to render a screen 1700 showing recent texts from the child's mobile device 10. If the text was sent while the child was driving, an alert could be generated and the text could be indicated as sent while driving on this screen. In a first column 1722, a message type is provided. In a second column 1724 the message content can be provided. In a third column 1726 a date and time of the message can be provided. And in a fourth column 1728 the phone of the other mobile device can be provided.

In some embodiments, selection of the Driving/Texting icon renders a screen that enables parents to prohibit texts, camera (image taking or capture), social media use, and all other communications to and from a child's phone while the child is driving. Otherwise, the monitoring and alert system may be configured to default to such prohibitions, which a parent may, in some embodiments, be given the ability to override and/or tailor. The prohibitions can have exceptions, such as enabling the child's phone to make emergency calls or texts, e.g., to 911 and/or to parents' phone numbers (e.g., cell phones, work phones, and/or home phone(s)). The parents' phone number(s) could be entered via and app on the child's phone and/or via a web interface to the monitoring and alert system. The monitored user app and/or system may allow, however, the use of a navigation app on the child's mobile phone.

A determination of whether or not the child is driving could be accomplished in a variety of manners, such as by GPS and or cellular data related to the phone and/or applications on the phone, or other appropriate network and/or vehicle data. The app can invoke the mobile phone prohibitions once the vehicle has reached a target (or threshold)

speed. For example, the target speed could be set at one mile per hour (mph), 5 mph, and so on. The target speed could be a system default or set by the parents through the alert and monitoring system. If it is by system default, the parents could be given the ability to override the default in some embodiments, wherein such override may be capped by the system to a maximum mph. In other embodiments, the target speed could be set by the system and not capable of override.

The parents' personal phone numbers and emergency numbers (e.g., 911) can be added within the set-up screens from the child's mobile device when the app is set up on the phone. Otherwise, the parents' personal phone numbers can be entered through the alert and monitoring system when setting up or updating a profile for the child, and then downloaded or otherwise communicated to the child's phone via the app. In some embodiments, the parents could also designate other phone numbers capable of receiving calls, such as a doctor, nanny, or babysitter.

In some embodiments, if a text and/or call were attempted, with the exception of known 911 entities and or the parents' entered phone numbers, while the child was driving, an alert would be generated by the child's phone and sent to the parents' phone(s), e.g., through the alert and monitoring system or directly, phone to phone, via a cellular network. The alert could indicate that a "violation" had occurred. The app, however, could prohibit the text or call from being completed, e.g., such functionally for texting, calling, and/or Web browsing could be disabled by the app in response to sensing that the mobile phone is moving (in a vehicle), e.g., at or beyond the target speed.

In some embodiments, a Time Out icon 1704 can be provided to enable the parent to turn off the child's mobile device 10.

Figure 18:
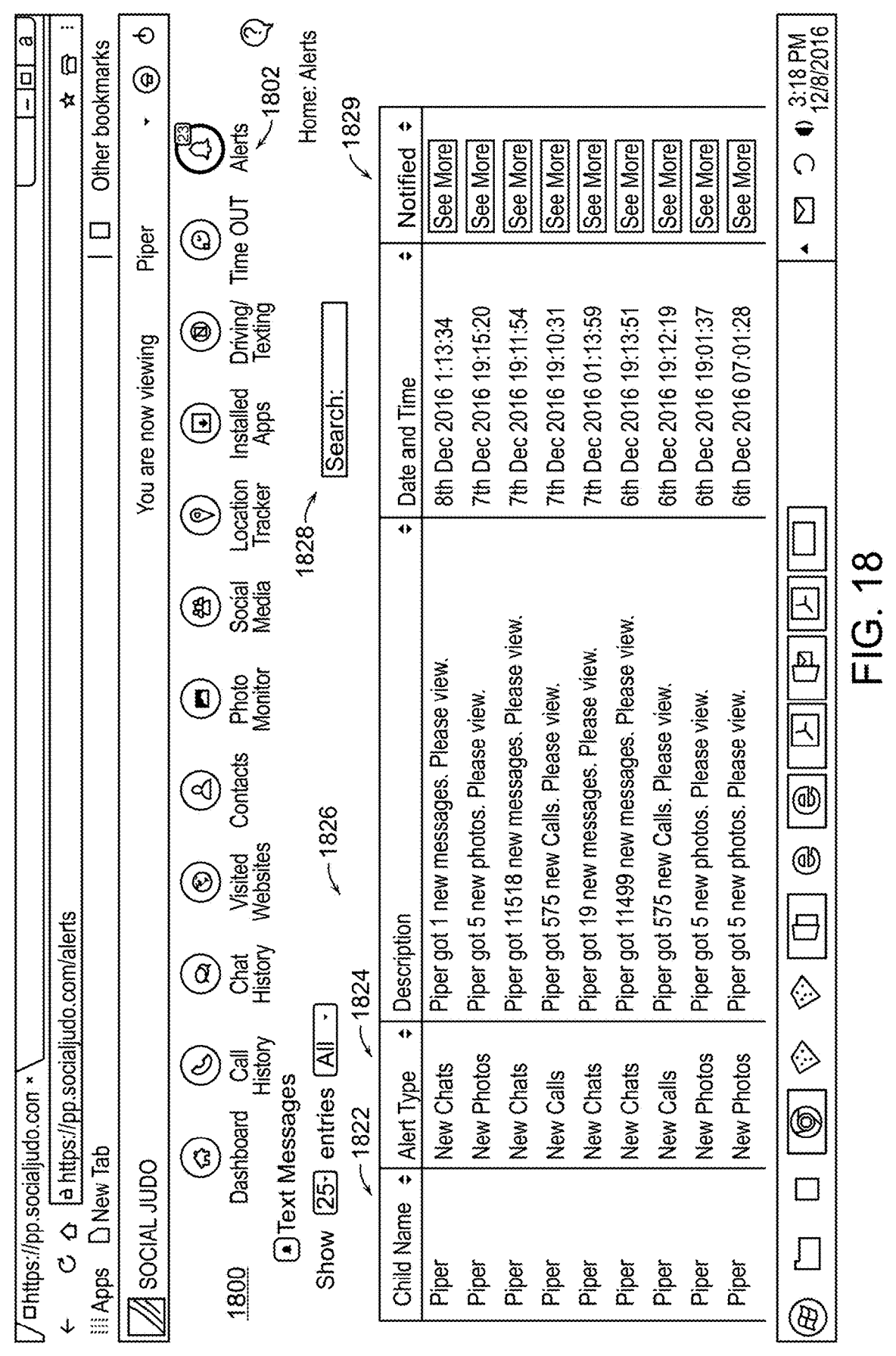

In FIG. 18, the Alerts icon 1802 has been selected to render a recent alerts screen 1800, having a listing of recent alerts generated in response to activity on the child's mobile device. In a first column 1822, the child's name is provided. In a second column 1824, an alert type is provided. In a third column 1826, a description of the alert is provided. In a fourth column 1828, a date and time of the alert is provided. And in a fifth column 1829 a button for revealing more information related to the alert is provided.

FIGS. 19 through 24 provide a different embodiment of the parent portal interface provided by the monitoring and alert system 100. Only icons and screen differing from those above will be described.

Figure 19:
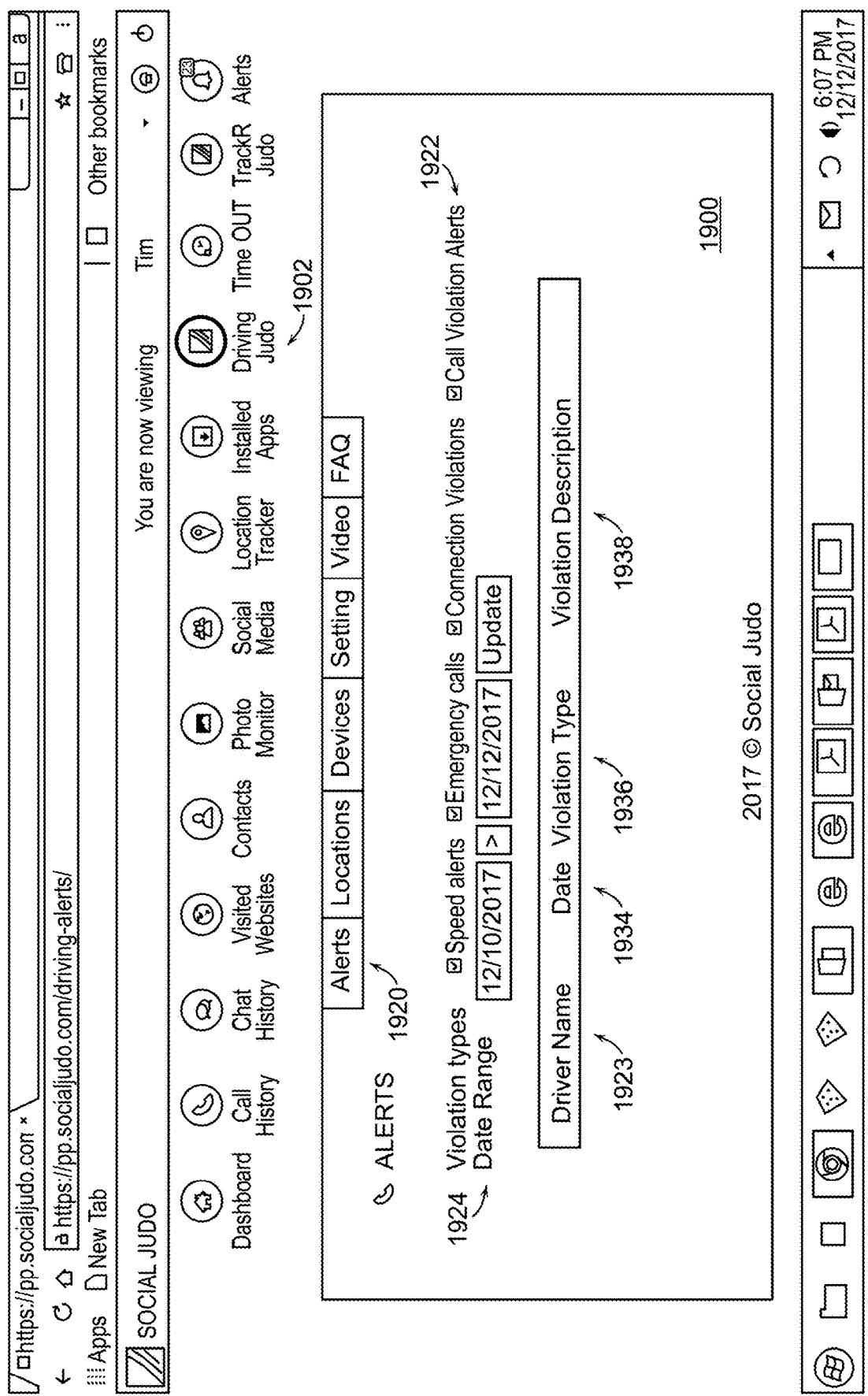

In FIG. 19, the Driving Judo icon 1902 has been selected to render a driving related monitoring and alert screens 1900, having a listing of recent alerts generated in response to driving activity related to the child's mobile device 10. In FIG. 1900, and Alerts tab 1920 is selected, yielding screen 1900. The screen 1900 enables parents to set violation types and alerts, e.g., speed alerts, emergency calls connection violations and call violation alerts, 1922. A date range field 1924 allows the parent user to select a date range of alerts to be shown in a table 1930 below. In a first column 1932, the driver's name is provided. In a second column 1934, a violation date is provided. In a third column 1936, a violation type is provided. In a fourth column 1938, violation description is provided.

Figure 20:
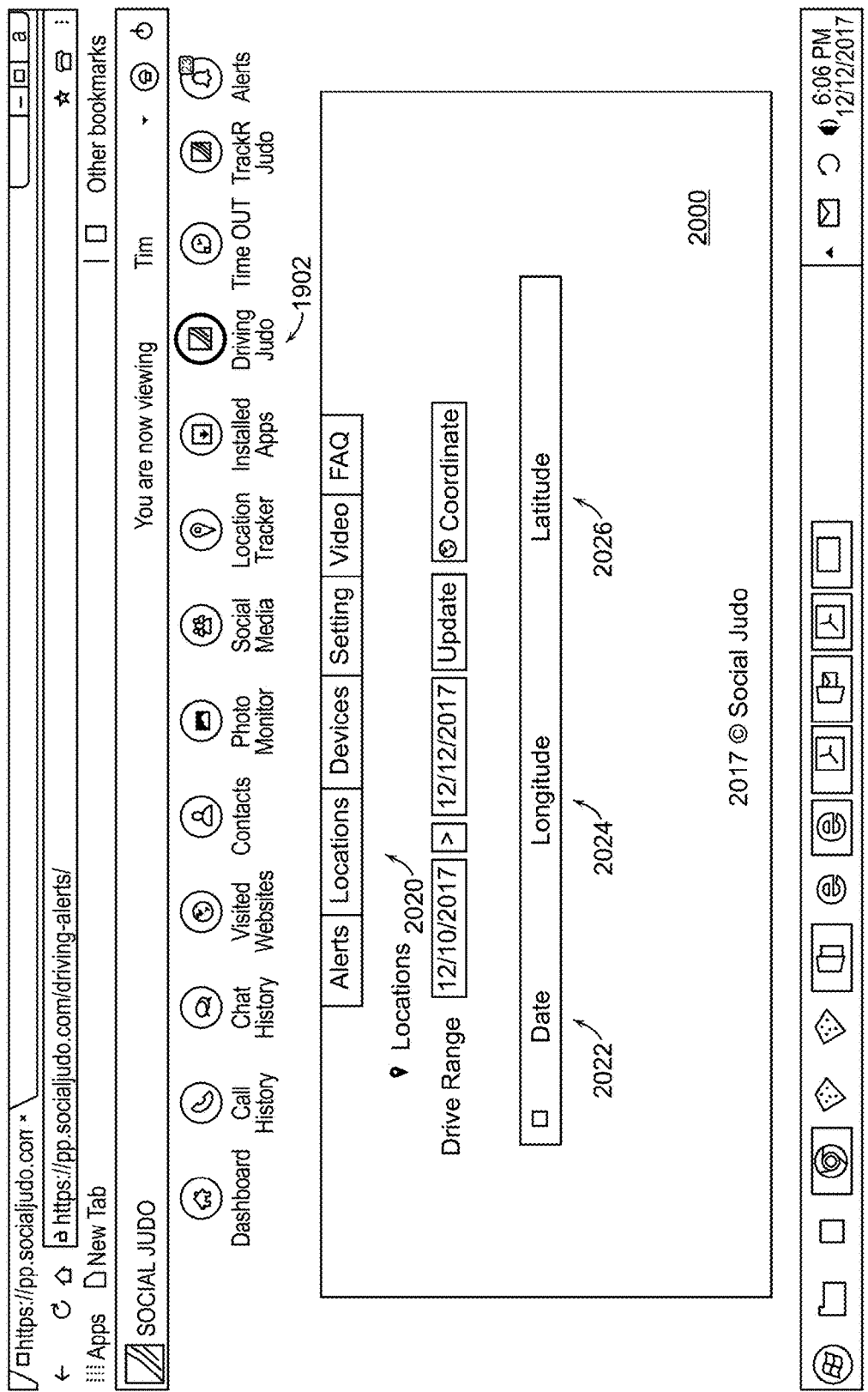

In FIG. 20, the Locations tab 2020 is selected, which yields a different screen 2000 indicating a location of one or more violations. In this screen 2000, the date range is again shown. A table of violations can be shown having a first column 2022 for a date of the violation. A second column 2024 shows a longitude of the violation and a third column 2026 shows a latitude of the violation. This data can be obtained from navigation program in the mobile device 10.

Figure 21:
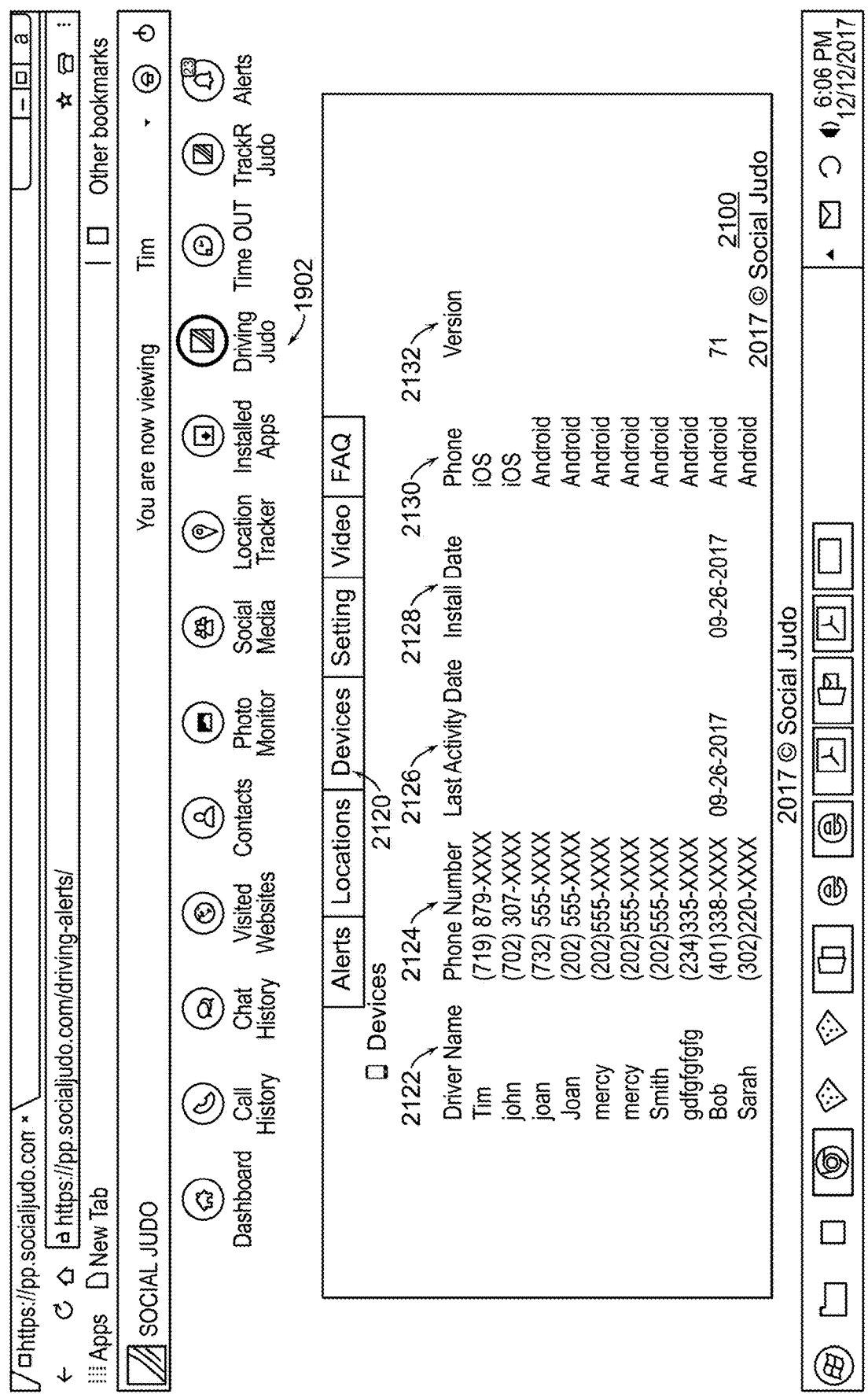

In FIG. 21, the Locations tab 2120 is selected, which yields a different screen 2100 indicating the devices 10, from those listed in the account, generating one or more violations. In this screen 2100, the data is provided in table form. A first column 2122 can indicate a driver name. A second column 2124 shows a driver phone number. A third column 2126 shows a last activity date for the mobile device 10. A fourth column 2128 shows an install date. A fifth column 2130 shows a phone type, e.g., iOS (Apple) or Android. And a sixth column 2132 can be included to show a version of the device.

Figure 22:
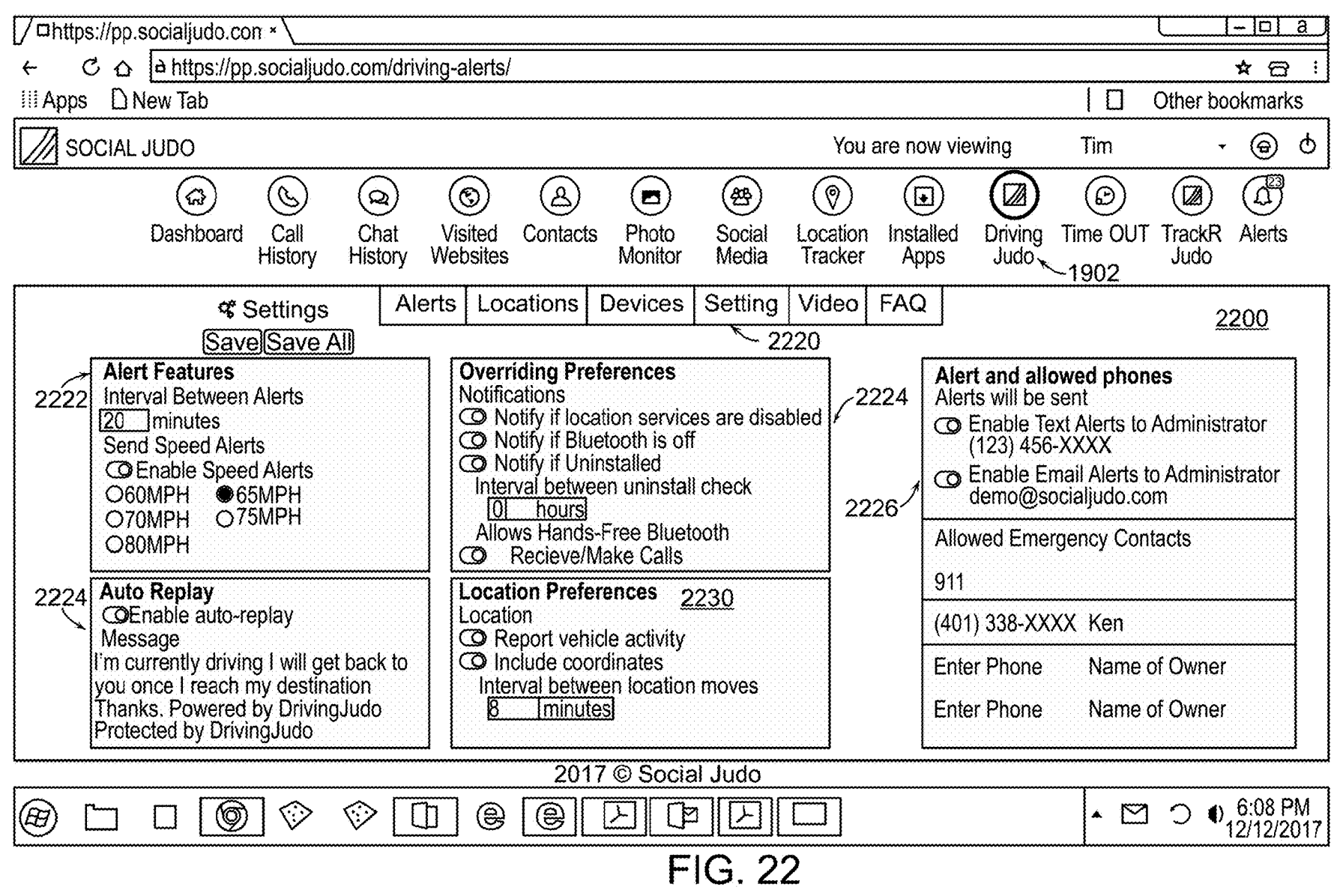

In FIG. 22, the Setting tab 2220 is selected, which yields a different screen 2200 indicating a plurality of setting for driver monitoring. In this screen 2200, a set of alert features 2222 is provided, with user (parent) selectable options, including time interval between alerts and speed at which to generate an alert. An overriding preferences 2224 option is provide indicating a plurality of user selectable options, including notification choices for alerts. An Auto Reply set of options 2228 is provided allowing the user (parent) to set options for responding to text message on mobile device 10 when the child is driving. And a Location Preferences option 2230 is provided to allow the user to set parameters for alerts depending on the location of the mobile device 10 when the child is driving.

Figure 23:
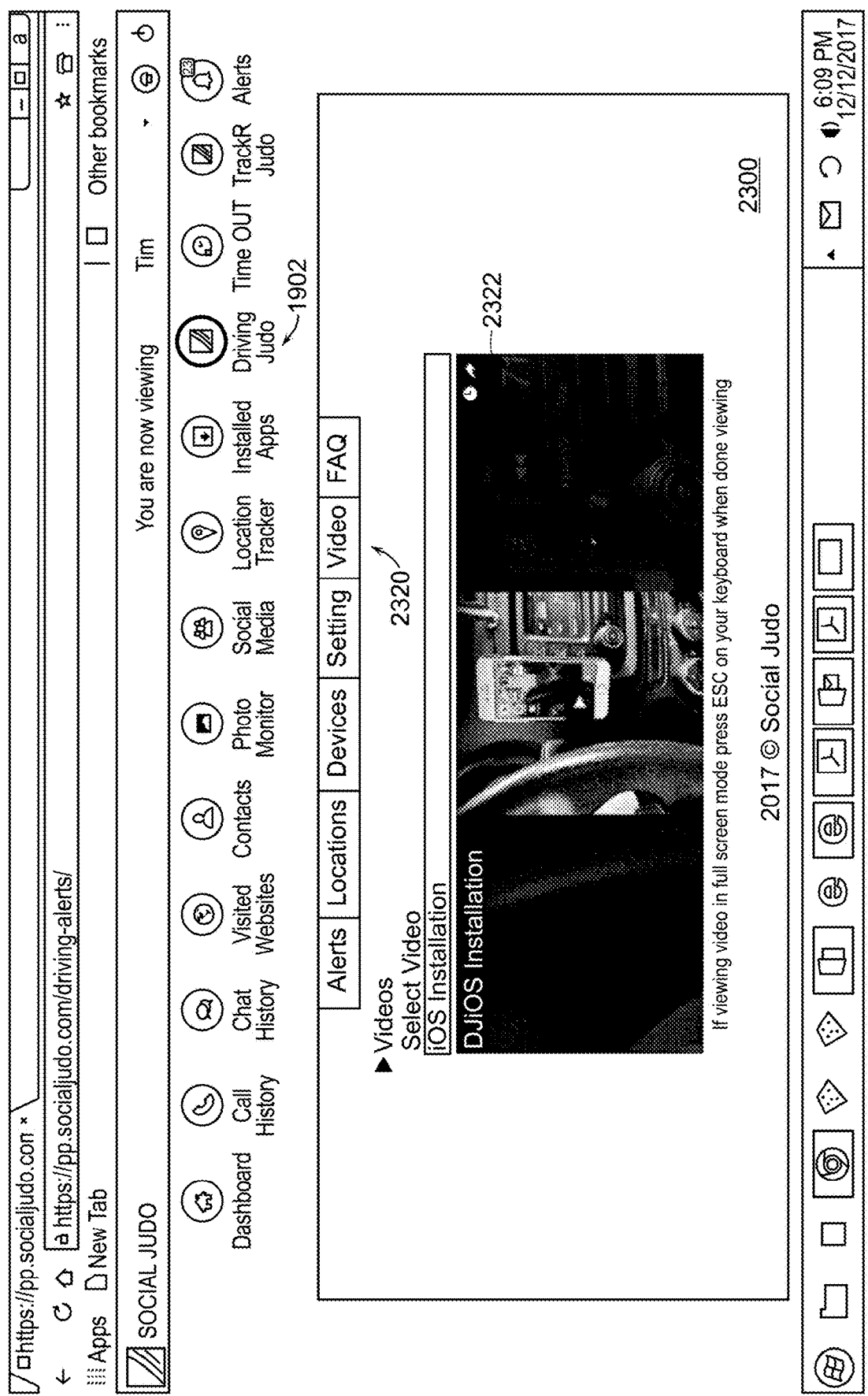

In FIG. 23, the Video tab 2320 is selected, which yields a different screen 2300 indicating a plurality of setting for driver monitoring. In this screen 2300, video from the mobile device 10 is provided to the parent mobile device 20, e.g., while the child user is driving.

Figure 24:
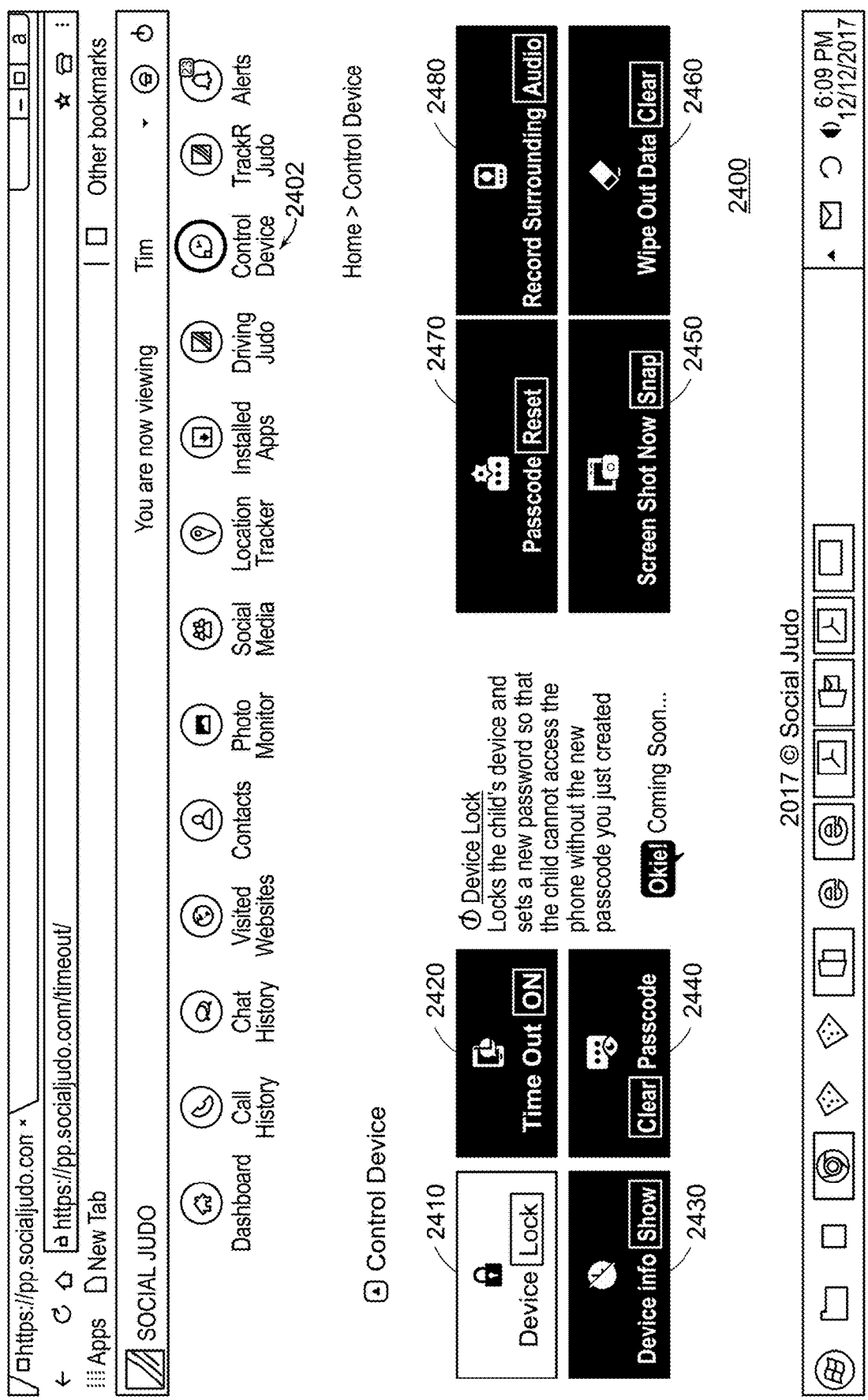

In FIG. 24, the Control Device icon 2402 has been selected to render a screen 2400 showing user (parent) selectable options for controlling the mobile device 10. The screen 2400 shows a set of user selectable boxes, each providing different control options. Selection of box 2410 enables a parent user to lock/unlock the mobile device 10. Selection of box 2420 enables parents to send a lockout time to the child's mobile device 10, the child will not be able to access the device 10 for that duration. Selection of box 2430 enables a parent to view mobile device 10 information, e.g., name of phone, Mac ID, IP address, etc. Selection of box 2440 enables a parent to remove a passcode from the mobile device 10, the child will not be notified that the parent has removed the passcode. Selection of box 2450 enables a parent to take a screenshot of the mobile device 10 in real time. Selection of box 2460 enables a parent to clear all data from the mobile device 10, resets to factory new settings. Selection of box 2470 enables a parent to set a new passcode to the mobile device 10, the child will not be notified that the parent has changed the passcode. Selection of box 2480 enables a parent to record surrounding audio, records the audio from the mobile device 10 in real time for up to 10 minutes, for example.

The functionality discussed above with respect to the screens described in FIGS. 2 through 24 are carried out by the monitoring and alert system 100, and the functional modules 55. That is, each functional module 55 can be configured to deliver the screen and functionality of the screen for one or more the screens in FIGS. 4-24.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A monitoring system, comprising:
    a monitoring and alert system having a processor providing a portal enabling access from a remote computer for establishment of monitoring and alert parameters and controls for at least one mobile device; and
    a mobile device application configured to execute on the at least one mobile device and to interact with the monitoring and alert system to monitor user interactions with the at least one mobile device and to provide alerts to an electronic monitoring device based on the established monitoring and alert parameters and controls,
    wherein:
        the monitoring and alert system represents the at least one mobile device and the monitoring device as nodes in a family of nodes of an evidence grid,
        communications among the nodes in the family of nodes are secure and encrypted and the monitoring device is configured to decrypt the communications associated with the at least one mobile device,
        the monitoring and alert system is configured to generate a driving option within the portal enabling the remote device to set communication prohibitions while driving for the at least one mobile device, and designate phone numbers and contacts as exceptions to the communication prohibitions while driving, and
        the mobile device application is configured to execute the communications prohibitions while driving when the vehicle reaches a threshold speed.

2. The system of claim 1, wherein the mobile device application is configured to determine if a user of the at least one mobile device is driving and, if so, to prohibit use of texting applications on the at least one mobile device while driving.

3. The system of claim 1, wherein the mobile device application is configured to send an alert to the monitoring device in response to use of the at least one mobile device while driving.

4. The system of claim 1, wherein the mobile device application is configured to prohibit use of social media applications on the at least one mobile device while driving.

5. The system of claim 1, wherein the mobile device application is configured to prohibit camera usage on the at least one mobile device while driving.

6. The system of claim 1, wherein the monitoring device is configured to cause the mobile device application to lock the at least one mobile device.

7. The system of claim 1, wherein the monitoring device is configured to cause the mobile device application to take a screenshot of the at least one mobile device in real time and forward the screenshot to the monitoring device.

8. The system of claim 1, wherein the monitoring device is configured to cause the mobile device application to record audio from the mobile device in real time and forward the audio to the monitoring device.

9. A method of monitoring and controlling at least one mobile device, comprising:
    providing a monitoring and alert system having a processor, said processor executing computer program code to establish a remotely accessible portal;
    enabling access to the portal from a remote computer for establishment of monitoring and alert parameters and controls for at least one mobile device;
    the monitoring and alert system representing the at least one mobile device and an electronic monitoring device as nodes in a family of nodes of an evidence grid, wherein communications among the nodes in the family of nodes are secure and encrypted and the monitoring device is configured to decrypt the communications associated with the at least one mobile device;
    the monitoring and alert system providing a driving option via the portal enabling the remote device to set communication prohibitions while driving for the at least one mobile device and designate one or more phone numbers and contacts as exceptions to the communication prohibitions while driving;
    electronically monitoring, using a mobile device application, user interactions with the at least one mobile device based on the established monitoring and alert parameters and controls; and
    the mobile device application executing the communications prohibitions while driving when the vehicle reaches a threshold speed.

10. The method of claim 9, including the mobile device application determining if a user of the at least one mobile device is driving and, if so, prohibiting use of texting applications on the at least one mobile device while driving.

11. The method of claim 9, including the mobile device application sending an alert to an electronic monitoring device in response to use of the at least one mobile device while driving.

12. The method of claim 9, including the mobile device application prohibiting use of social media applications on the at least one mobile device while driving.

13. The method of claim 9, including the mobile device application prohibiting camera usage on the at least one mobile device while driving.

14. The method of claim 9, including an electronic monitoring device causing the monitoring device application to lock the at least one mobile device.

15. The method of claim 9, including an electronic monitoring device causing the monitoring device application to take a screenshot of the at least one mobile device in real time.

16. The method of claim 9 including an electronic monitoring device causing the monitoring device application to record audio from the mobile device in real time.

* * * * *